(12) United States Patent
Garvey et al.

(10) Patent No.: US 10,855,548 B2
(45) Date of Patent: Dec. 1, 2020

(54) SYSTEMS AND METHODS FOR AUTOMATICALLY DETECTING, SUMMARIZING, AND RESPONDING TO ANOMALIES

(71) Applicant: Oracle International Corporation, Redwood Shores, CA (US)

(72) Inventors: Dustin Garvey, Exeter, NH (US); Neil Goodman, San Rafael, CA (US); Sampanna Shahaji Salunke, Dublin, CA (US); Brent Arthur Enck, Roseville, CA (US); Sumathi Gopalakrishnan, Fremont, CA (US); Amit Ganesh, San Jose, CA (US); Timothy Mark Frazier, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/277,012

(22) Filed: Feb. 15, 2019

(65) Prior Publication Data
US 2020/0267057 A1   Aug. 20, 2020

(51) Int. Cl.
*H04L 12/24* (2006.01)
*H04L 12/26* (2006.01)

(52) U.S. Cl.
CPC ........ *H04L 41/142* (2013.01); *H04L 41/0816* (2013.01); *H04L 41/0886* (2013.01);
(Continued)

(58) Field of Classification Search
CPC ............... H04L 41/142; H04L 41/0816; H04L 41/0886; H04L 43/067; H04L 43/08; H04L 43/04
See application file for complete search history.

(56) References Cited

U.S. PATENT DOCUMENTS 6,298,063 B1   10/2001   Coile et al.
6,438,592 B1   8/2002   Killian
(Continued)

FOREIGN PATENT DOCUMENTS

CN    105426411 A    3/2016
CN    109359763 A    2/2019
(Continued)

OTHER PUBLICATIONS

Wilks, Samuel S. "Determination of sample sizes for setting tolerance limits," The Annals of Mathematical Statistics 12.1 (1941): 91-96.

(Continued)

*Primary Examiner* — Michael C Lai
(74) *Attorney, Agent, or Firm* — Invoke

(57) ABSTRACT

Techniques are disclosed for summarizing, diagnosing, and correcting the cause of anomalous behavior in computing systems. In some embodiments, a system identifies a plurality of time series that track different metrics over time for a set of one or more computing resources. The system detects a first set of anomalies in a first time series that tracks a first metric and assigns a different respective range of time to each anomaly. The system determines whether the respective range of time assigned to an anomaly overlaps with timestamps or ranges of time associated with anomalies from one or more other time series. The system generates at least one cluster that groups metrics based on how many anomalies have respective ranges of time and/or timestamps that overlap. The system may preform, based on the cluster, one or more automated actions for diagnosing or correcting a cause of anomalous behavior.

20 Claims, 12 Drawing Sheets

(52) U.S. Cl.
CPC ............ *H04L 43/04* (2013.01); *H04L 43/067* (2013.01); *H04L 43/08* (2013.01)

(56) References Cited

U.S. PATENT DOCUMENTS

| | | | |
|---|---|---|---|
| 6,597,777 B1* | 7/2003 | Ho | H04L 41/0896 |
| | | | 370/235 |
| 6,643,613 B2 | 11/2003 | McGee et al. | |
| 6,996,599 B1 | 2/2006 | Anders et al. | |
| 7,343,375 B1 | 3/2008 | Dulac | |
| 7,529,991 B2 | 5/2009 | Ide et al. | |
| 7,672,814 B1 | 3/2010 | Raanan et al. | |
| 7,739,143 B1 | 6/2010 | Dwarakanath et al. | |
| 7,739,284 B2 | 6/2010 | Aggarwal et al. | |
| 7,783,510 B1 | 8/2010 | Gilgur et al. | |
| 7,987,106 B1 | 7/2011 | Aykin | |
| 8,200,454 B2 | 6/2012 | Dorneich et al. | |
| 8,229,876 B2 | 7/2012 | Roychowdhury | |
| 8,234,236 B2 | 7/2012 | Beaty et al. | |
| 8,363,961 B1 | 1/2013 | Avidan et al. | |
| 8,576,964 B2 | 11/2013 | Taniguchi et al. | |
| 8,650,299 B1 | 2/2014 | Huang et al. | |
| 8,676,964 B2* | 3/2014 | Gopalan | H04L 41/142 |
| | | | 370/230.1 |
| 8,694,969 B2 | 4/2014 | Bernardini et al. | |
| 8,776,066 B2 | 7/2014 | Krishnamurthy et al. | |
| 8,880,525 B2 | 11/2014 | Galle et al. | |
| 8,930,757 B2 | 1/2015 | Nakagawa | |
| 8,949,677 B1 | 2/2015 | Brundage et al. | |
| 9,002,774 B2 | 4/2015 | Karlsson | |
| 9,141,914 B2 | 9/2015 | Viswanathan et al. | |
| 9,147,167 B2 | 9/2015 | Urmanov et al. | |
| 9,195,563 B2 | 11/2015 | Scarpelli | |
| 9,218,232 B2 | 12/2015 | Khalastchi et al. | |
| 9,292,408 B2* | 3/2016 | Bernstein | G06F 11/079 |
| 9,323,599 B1* | 4/2016 | Iyer | G06F 11/0751 |
| 9,323,837 B2 | 4/2016 | Zhao et al. | |
| 9,330,119 B2 | 5/2016 | Chan et al. | |
| 9,355,357 B2 | 5/2016 | Hao et al. | |
| 9,367,382 B2 | 6/2016 | Yabuki | |
| 9,389,946 B2 | 7/2016 | Higuchi | |
| 9,471,778 B1 | 10/2016 | Seo et al. | |
| 9,495,220 B2 | 11/2016 | Talyansky | |
| 9,507,718 B2 | 11/2016 | Rash et al. | |
| 9,514,213 B2 | 12/2016 | Wood et al. | |
| 9,529,630 B1 | 12/2016 | Fakhouri et al. | |
| 9,658,916 B2 | 5/2017 | Yoshinaga et al. | |
| 9,692,662 B2 | 6/2017 | Chan et al. | |
| 9,710,493 B2 | 7/2017 | Wang et al. | |
| 9,727,533 B2 | 8/2017 | Thibaux | |
| 9,740,402 B2 | 8/2017 | Manoharan et al. | |
| 9,779,361 B2 | 10/2017 | Jones et al. | |
| 9,811,394 B1 | 11/2017 | Kogias et al. | |
| 9,961,571 B2* | 5/2018 | Yang | H04W 24/04 |
| 10,073,906 B2* | 9/2018 | Lu | G06F 16/285 |
| 10,210,036 B2* | 2/2019 | Iyer | G06F 11/0751 |
| 2002/0019860 A1 | 2/2002 | Lee et al. | |
| 2002/0092004 A1 | 7/2002 | Lee et al. | |
| 2002/0183972 A1 | 12/2002 | Enck et al. | |
| 2002/0188650 A1 | 12/2002 | Sun et al. | |
| 2003/0149603 A1 | 8/2003 | Ferguson et al. | |
| 2003/0224344 A1 | 12/2003 | Shamir et al. | |
| 2004/0088406 A1 | 5/2004 | Corley et al. | |
| 2005/0119982 A1 | 6/2005 | Ito et al. | |
| 2005/0132030 A1 | 6/2005 | Hopen et al. | |
| 2005/0159927 A1 | 7/2005 | Cruz et al. | |
| 2005/0193281 A1 | 9/2005 | Ide et al. | |
| 2006/0087962 A1 | 4/2006 | Golia et al. | |
| 2006/0212593 A1 | 9/2006 | Patrick et al. | |
| 2006/0287848 A1 | 12/2006 | Li et al. | |
| 2007/0011281 A1 | 1/2007 | Jhoney et al. | |
| 2007/0150329 A1 | 6/2007 | Brook et al. | |
| 2007/0179836 A1 | 8/2007 | Juang et al. | |
| 2008/0221974 A1 | 9/2008 | Gilgur et al. | |
| 2008/0288089 A1 | 11/2008 | Pettus et al. | |
| 2009/0030752 A1 | 1/2009 | Senturk-Doganaksoy et al. | |
| 2010/0027552 A1 | 2/2010 | Hill | |
| 2010/0050023 A1* | 2/2010 | Scarpelli | G06F 11/0709 |
| | | | 714/46 |
| 2010/0082132 A1 | 4/2010 | Marruchella et al. | |
| 2010/0082697 A1 | 4/2010 | Gupta et al. | |
| 2010/0185499 A1 | 7/2010 | Dwarakanath et al. | |
| 2010/0257133 A1 | 10/2010 | Crowe et al. | |
| 2010/0324869 A1 | 12/2010 | Cherkasova et al. | |
| 2011/0022879 A1 | 1/2011 | Chavda et al. | |
| 2011/0040575 A1 | 2/2011 | Wright et al. | |
| 2011/0125894 A1 | 5/2011 | Anderson et al. | |
| 2011/0126197 A1 | 5/2011 | Larsen et al. | |
| 2011/0126275 A1 | 5/2011 | Anderson et al. | |
| 2011/0213788 A1 | 9/2011 | Zhao et al. | |
| 2011/0265164 A1 | 10/2011 | Lucovsky et al. | |
| 2012/0005359 A1 | 1/2012 | Seago et al. | |
| 2012/0051369 A1 | 3/2012 | Bryan et al. | |
| 2012/0066389 A1 | 3/2012 | Hegde et al. | |
| 2012/0110462 A1 | 5/2012 | Eswaran et al. | |
| 2012/0110583 A1 | 5/2012 | Balko et al. | |
| 2012/0203823 A1 | 8/2012 | Manglik et al. | |
| 2012/0240072 A1 | 9/2012 | Altamura et al. | |
| 2012/0254183 A1 | 10/2012 | Ailon et al. | |
| 2012/0278663 A1 | 11/2012 | Hasegawa | |
| 2012/0323988 A1* | 12/2012 | Barzel | H04L 43/08 |
| | | | 709/202 |
| 2013/0024173 A1 | 1/2013 | Brzezicki et al. | |
| 2013/0080374 A1 | 3/2013 | Karlsson | |
| 2013/0326202 A1 | 12/2013 | Rosenthal et al. | |
| 2013/0329981 A1 | 12/2013 | Hiroike | |
| 2014/0067757 A1 | 3/2014 | Ailon et al. | |
| 2014/0095422 A1 | 4/2014 | Solomon et al. | |
| 2014/0101300 A1 | 4/2014 | Rosensweig et al. | |
| 2014/0215470 A1 | 7/2014 | Iniguez | |
| 2014/0310235 A1 | 10/2014 | Chan et al. | |
| 2014/0310714 A1 | 10/2014 | Chan et al. | |
| 2014/0325649 A1 | 10/2014 | Zhang | |
| 2014/0379717 A1 | 12/2014 | Urmanov et al. | |
| 2015/0032775 A1 | 1/2015 | Yang et al. | |
| 2015/0033084 A1* | 1/2015 | Sasturkar | G06F 11/3006 |
| | | | 714/46 |
| 2015/0040142 A1 | 2/2015 | Cheetancheri et al. | |
| 2015/0046123 A1 | 2/2015 | Kato | |
| 2015/0046920 A1 | 2/2015 | Allen | |
| 2015/0065121 A1 | 3/2015 | Gupta et al. | |
| 2015/0180734 A1 | 6/2015 | Maes et al. | |
| 2015/0242243 A1 | 8/2015 | Balakrishnan et al. | |
| 2015/0244597 A1* | 8/2015 | Maes | G06Q 10/10 |
| | | | 715/736 |
| 2015/0248446 A1 | 9/2015 | Nordstrom et al. | |
| 2015/0251074 A1 | 9/2015 | Ahmed et al. | |
| 2015/0296030 A1 | 10/2015 | Maes et al. | |
| 2015/0312274 A1 | 10/2015 | Bishop et al. | |
| 2016/0034328 A1 | 2/2016 | Poola et al. | |
| 2016/0042289 A1 | 2/2016 | Poola et al. | |
| 2016/0092516 A1 | 3/2016 | Poola et al. | |
| 2016/0105327 A9* | 4/2016 | Cremonesi | G06Q 10/06 |
| | | | 706/21 |
| 2016/0139964 A1 | 5/2016 | Chen et al. | |
| 2016/0171037 A1 | 6/2016 | Mathur et al. | |
| 2016/0253381 A1 | 9/2016 | Kim et al. | |
| 2016/0283533 A1 | 9/2016 | Urmanov et al. | |
| 2016/0292611 A1 | 10/2016 | Boe et al. | |
| 2016/0294773 A1 | 10/2016 | Yu et al. | |
| 2016/0299938 A1 | 10/2016 | Malhotra et al. | |
| 2016/0299961 A1 | 10/2016 | Olsen | |
| 2016/0321588 A1 | 11/2016 | Das et al. | |
| 2016/0342909 A1 | 11/2016 | Chu et al. | |
| 2016/0357674 A1 | 12/2016 | Waldspurger et al. | |
| 2016/0378809 A1 | 12/2016 | Chen et al. | |
| 2017/0061321 A1 | 3/2017 | Maiya et al. | |
| 2017/0249564 A1 | 8/2017 | Garvey et al. | |
| 2017/0249648 A1 | 8/2017 | Garvey et al. | |
| 2017/0249649 A1 | 8/2017 | Garvey et al. | |
| 2017/0249763 A1 | 8/2017 | Garvey et al. | |
| 2017/0262223 A1 | 9/2017 | Dalmatov et al. | |
| 2017/0329660 A1 | 11/2017 | Salunke et al. | |
| 2017/0351563 A1 | 12/2017 | Miki et al. | |

(56) References Cited

U.S. PATENT DOCUMENTS

| | | | |
|---|---|---|---|
| 2017/0364851 | A1 | 12/2017 | Maheshwari et al. |
| 2018/0026907 | A1* | 1/2018 | Miller .................. G11C 5/06 709/226 |
| 2018/0039555 | A1* | 2/2018 | Salunke ............ G06F 11/3409 |
| 2018/0052804 | A1 | 2/2018 | Mikami et al. |
| 2018/0053207 | A1 | 2/2018 | Modani et al. |
| 2018/0059628 | A1 | 3/2018 | Yoshida |
| 2018/0081629 | A1 | 3/2018 | Kuhhirte et al. |
| 2018/0219889 | A1 | 8/2018 | Oliner et al. |
| 2018/0321989 | A1 | 11/2018 | Shetty et al. |
| 2018/0324199 | A1 | 11/2018 | Crotinger et al. |
| 2018/0330433 | A1 | 11/2018 | Frenzel et al. |
| 2019/0042982 | A1 | 2/2019 | Qu et al. |
| 2019/0065275 | A1 | 2/2019 | Wong et al. |
| 2020/0034745 | A1 | 1/2020 | Nagpal et al. |

FOREIGN PATENT DOCUMENTS

| | | |
|---|---|---|
| JP | 2006-129446 A | 5/2006 |
| WO | 20111071624 A2 | 6/2011 |
| WO | 20131016584 A1 | 1/2013 |

OTHER PUBLICATIONS

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Greunen, "Forecasting Methods for Cloud Hosted Resources, a comparison," 2015, 11th International Conference on Network and Service Management (CNSM), pp. 29-35 (Year: 2015).

Faraz Rasheed, "A Framework for Periodic Outlier Pattern Detection in Time-Series Sequences," May 2014, IEEE.

Yokoyama, Tetsuya, "Windows Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al.,"Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", Omega, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Slipetskyy, Rostyslav, "Security Issues in OpenStack", Master's Thesis, Technical University of Denmark, Jun. 2011, 90 pages.

Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2018] pp. 2-6.

Charapko, Gorilla—Facebook's Cache for Time Series Data, http://charap.co/gorilla-facebooks-cache-for-monitoring-data/, Jan. 11, 2017.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Ahmed, Reservoir-based network traffic stream summarization for anomaly detection, Article in Pattern Analysis and Applications, Oct. 2017.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

Herbst, "Self-adaptive workload classification and forecasting for proactive resource provisioning", 2014, ICPE'13, pp. 187-198 (Year: 2014).

Suntinger, "Trend-based similarity search in time-series data," 2010, Second International Conference on Advances in Databases, Knowledge, and Data Applications, IEEE, pp. 97-106 (Year: 2010).

(56) References Cited

OTHER PUBLICATIONS

Yin, "System resource utilization analysis and prediction for cloud based applications under bursty workloads," 2014, Information Sciences, vol. 279, pp. 338-357 (Year: 2014).

* cited by examiner

800

ANOMALY SUMMARIES

- 94% of the anomalies occur in a cluster of correlated anomalies that includes
  - {web server, C88WS, WebApplication, activeSessions},
  - {web server, C88WS, WebRequests, serviceTimeMS},
  - {database, C89DB, OraDB_Load, averageActiveSessions},
  - {database, C89DB, OraDB_Latency, sqlServiceResponseTime},
  - {database, C89DB, OraDB_Latency, dbFileSequentialReadTime},
  - {database, C89DB, OraDB_Latency, avgSynchronousSingleBlockReadLatency},
  - {host, C89HD, HOST_DiskActivitySummary, allDisksReqIOps},
  - {host, C89HD, HOST_CPU, cpuUtilizationPercent},
  - {apm_page, C88PA, BaselineablePageMetrics, avgResponseTime}.
- 47% of the anomalies occur in entities of type apm_page.
- 47% of the anomalies occur in C88PA.
- 45% of the anomalies occur in apm_page, BaselineablePageMetrics, avgResponseTime.
- 24% of the anomalies occur in entities of type database.

FIG. 8

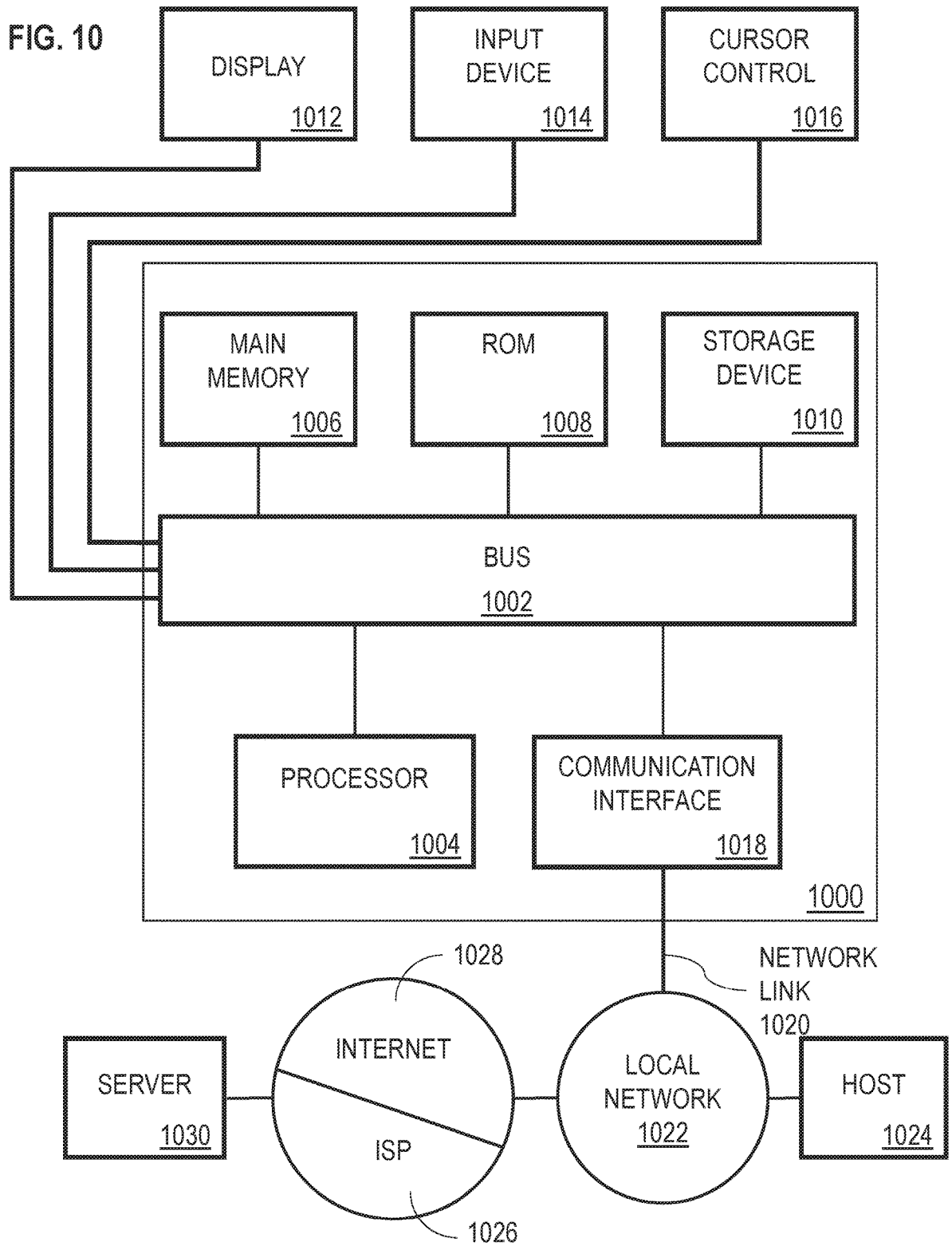

SYSTEMS AND METHODS FOR
AUTOMATICALLY DETECTING,
SUMMARIZING, AND RESPONDING TO
ANOMALIES

RELATED APPLICATIONS

The present application is related to U.S. application Ser. No. 15/609,938, titled "UNSUPERVISED METHOD FOR BASELINING AND ANOMALY DETECTION IN TIME-SERIES DATA FOR ENTERPRISE SYSTEMS"; U.S. application Ser. No. 15/140,358, now U.S. Pat. No. 10,073,906, entitled "SCALABLE TRI-POINT ARBITRATION AND CLUSTERING"; and U.S. application Ser. No. 15/155,486, entitled "CORRELATION-BASED ANALYTIC FOR TIME-SERIES DATA", the entire contents for each of which are incorporated by reference herein as if set forth in their entirety.

TECHNICAL FIELD

The present disclosure relates to anomaly detection systems and methods. In particular, the present disclosure relates to detecting, summarizing, and responding to anomalies in complex computing applications comprising a plurality of interrelated resources.

BACKGROUND

System administrators are often responsible for monitoring computing applications to detect divergence from expected patterns of behavior. Many modern computing applications are difficult to monitor due to the number and complexity of the underlying application entities. For example, a cloud service may include load balancers, web servers, application logic, database servers, and other software and hardware resources deployed across different application tiers. Adding to the complexity, the performance of one entity is often interdependent on other entities associated with the application. As a result, promptly detecting and responding to the root cause of anomalous behavior is a challenging task. A failure to timely identify and respond to anomalies may result in various problems such as performance degradation, security breaches, and compromised data integrity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 illustrates an example list of the top-n summaries, in accordance with some embodiments.

FIG. 10 shows a block diagram that illustrates a computer system in accordance with some embodiments.

DETAILED DESCRIPTION

Figure 1:
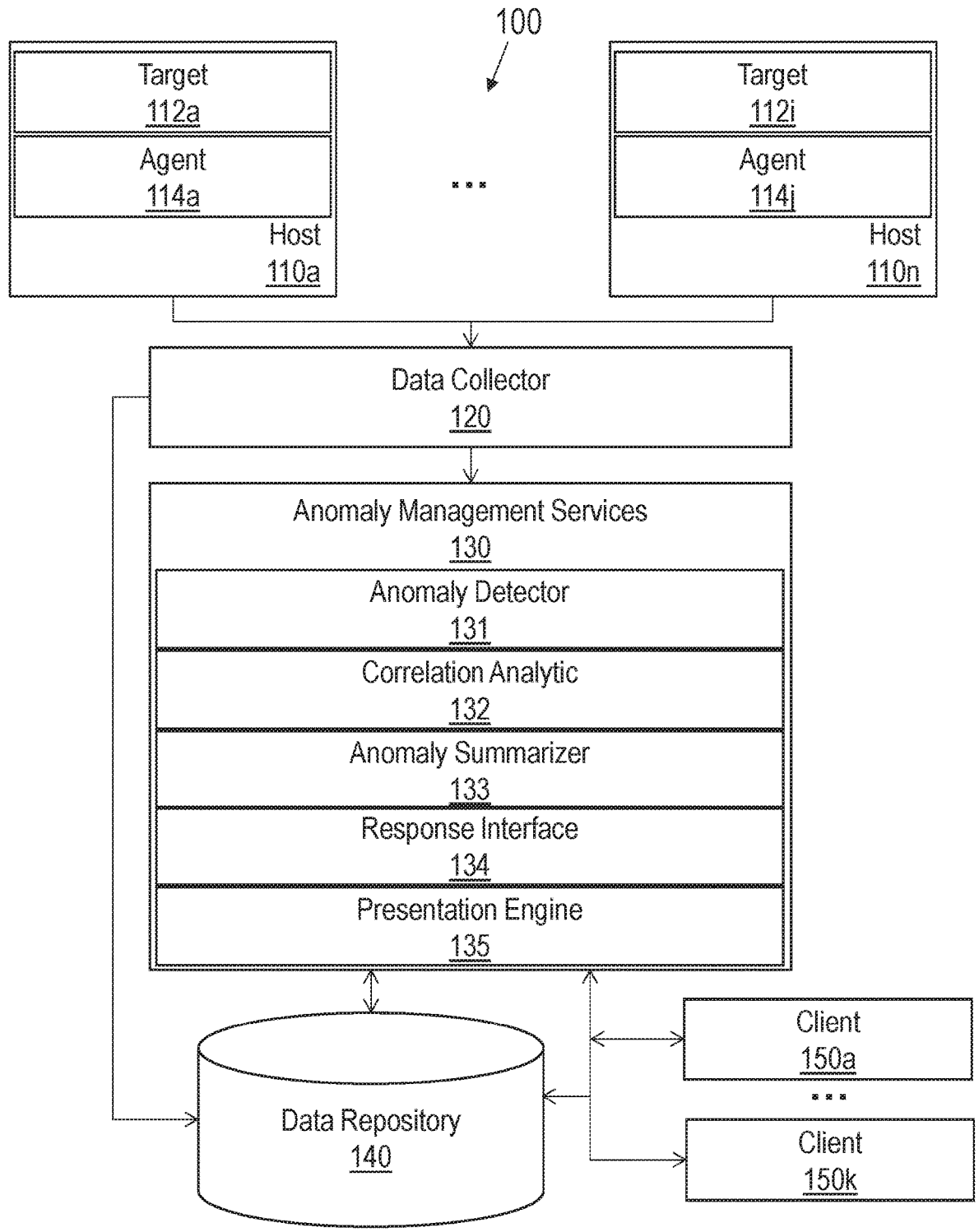
FIG. 1 illustrates an example system for automatically detecting, summarizing, and responding to anomalous time series signals in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 EXTENSIBLE SCORE-BASED SUMMARIZATION
   3.1 ANOMALY DETECTION
   3.2 MULTIPLEX SCORE-BASED SUMMARIZATION
   3.3 SUMMARIZER CONFIGURATION AND EXTENSIBILITY
4.0 CORRELATION-BASED SUMMARIZATION
   4.1 OVERLAPPING ANOMALY RANGES
   4.2 CLUSTER-BASED SCORING AND SUMMARIZATION
5.0 ACTIONABLE ANALYTICS AND INTERFACES
6.0 COMPUTER NETWORKS AND CLOUD NETWORKS
7.0 MICROSERVICE APPLICATIONS
8.0 HARDWARE OVERVIEW
9.0 MISCELLANEOUS; EXTENSIONS

1.0 General Overview

Manual detection of anomalous behavior is not practicable or scalable to large and complex systems. System administrators generally do not have the bandwidth to concurrently monitor several different resources on a continuous basis or the expertise to identify all instances of divergent behavior. System administrators may use assistive tools, such as statistical anomaly detectors, to facilitate monitoring. However, these assistive tools typically suffer from several shortcomings. As an example, statistical anomaly detectors are often designed to monitor individual resources, providing little to no information on how anomalies between interdependent resources may be related. Consequently, alerts generated by statistical anomaly detectors may still rely on system administrators to try and stitch together how individual anomalies relate to the overall performance of an application.

Other shortcomings of statistical anomaly detectors include their proclivity to generate false positives and to lack information about the significance of a detected anomaly. In large-scale systems, a system administrator may be inundated with alerts of anomalous behavior without any information about the best approach for resolving any detected issues. The system administrators may attempt to address the alerts one-by-one in the order that the alerts were triggered. However, this approach is generally inefficient and difficult to scale. The administrator may not have enough bandwidth to process all the alerts in a timely manner. Further, many of the alerts may be false positives, tangential to the root cause of a problem, redundant, and/or otherwise low priority.

Techniques are described herein for automatically detecting, summarizing and responding to anomalies. The techniques allow for anomalies across various entities of an application to be correlated in a manner that is scalable and efficient. In some embodiments, systems and methods detect correlated anomalies by co-occurrence within particular timeframes or ranges of time. The systems and methods may identify correlated anomalies without calculating correlation coefficients, which is often compute-intensive for large datasets. The correlation techniques described herein allow links to be established between anomalies that may not be readily apparent. The links may be used to isolate and respond to the root cause of divergent behavior within an application.

The techniques further allow for anomalies to be associated and summarized across various dimensions of an application. For example, anomalies may be aggregated and summarized by entity type, metric type, target host, and/or any other attribute or combination of attributes. A summary by different entity types, for instance, may identify what percentage of anomalies detected within a given timeframe were on web servers versus database servers, application servers, and/or other entity types. Other examples of summaries across different dimensions are described further herein.

Using multiple summaries across varying dimensions may allow users to quickly identify relationships between correlated anomalies and take appropriate corrective action, if warranted. Automated interfaces and actions may also be presented on a per-summary basis. For example, available patches may be recommended or automatically installed on resources that are exhibiting anomalous behavior. Other actions may also be presented and/or automated to address unexpected application behavior, such as performance degradation.

In some embodiments, summaries are assigned a score based on the relative severities of the anomalies being summarized. The relative severity for a sample anomaly may be computed as a function of one or more factors, which may include (a) if the sample anomaly is above or below a baseline; (b) how much above or below the baseline the sample anomaly is; and/or (c) how much un-anomalous samples from the same time series vary from the baseline. The relative severities from different sample anomalies may be summed together, averaged, or otherwise aggregated to generate a score for a summary. The score may be used to sort, filter, and/or control presentation of summaries to an end user. Additionally or alternatively, other automated actions, such as installing patches and restarting resources, may be triggered as a function of a summary's score. Scoring the summaries allows anomalies that are the most critical and highest priority to be timely addressed. Lower-scored anomalies, which may include false positives, may be ignored or addressed in a manner that optimizes efficiency.

In some embodiments, anomaly time series are clustered and summarized by co-occurrence of anomalies. To generate the clusters, anomaly time series may be aligned based on sample frequency. A respective range of time may be assigned to each anomaly within an anomaly time series. Assigning ranges of times allows for anomalies to persist beyond their discrete occurrence time, which provides flexibility in sampling rates and runtime tuning. The ranges of time from one time series may be compared to timestamps and/or ranges of time assigned to another time series. The time series may then be clustered based at least in part on the extent and consistency of the overlap. Cluster summaries may be generated and assigned a score, which may be used to sort, filter, present summary interfaces. Other automated actions may also be triggered for one or more members of a cluster, as described further herein.

One or more embodiments described in this Specification and/or recited in the claims may not be included in this General Overview section.

2.0 System Architecture

In some embodiments, systems described herein include software and/or hardware components configured to process time series signals. A time series signal comprises a sequence of values that are captured over time. The source of the time series data and the type of information that is captured may vary from implementation to implementation. For example, a time series may be collected from one or more software and/or hardware resources and capture various performance attributes of the computing resources from which the sample data points were collected. As another example, a time series may be collected using one or more sensors that measure physical properties, such as temperature, pressure, motion, traffic flow, physiological metrics or other attributes of an object or environment.

In some embodiments, systems described herein capture time series signals from multiple entities of an application. An entity in this context may correspond to a software resource, hardware resource, or some other component used in the functioning of an application. In some embodiments, an application follows a multi-tier or multilayered architecture. For example, a three-tier architecture may include a presentation tier for providing a user interface, an application tier for executing the core application logic, and a data tier for managing data access. Each tier may comprise one or more components that are logically and/or physically separated from other tiers. In the three-tier architecture, the presentation tier may comprise one or more web servers, the application tier one or more application servers, and the data tier one or more database servers. However, the number of tiers and the components deployed therein may vary from one implementation to the next.

In some embodiments, multiple time series may be generated for a single entity to track different metrics. As an example, for a given database server, one time series may track the number of active database sessions, a second may track the average query response times, and a third may track the average sequential data read times. As another example, for a given host, a first time series may track the central processing unit (CPU) utilization rate and a second may track the memory utilization rate. The number and types of metrics that are collected for each entity may thus vary from implementation to implementation.

FIG. 1 illustrates example system 100 for automatically detecting, summarizing, and responding to anomalous time series signals in accordance with some embodiments. System 100 generally comprises hosts 110a-n, data collector 120, anomaly management services 130, data repository 140, and clients 150a-k. The components illustrated in FIG. 1 may be implemented in software and/or hardware. Each component may be distributed over multiple applications and/or machines. Multiple components may be combined into one application and/or machine. Operations described with respect to one component may instead be performed by another component.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Hosts 110a-n represent a set of one or more network hosts and generally comprise targets 112a-i and agents 114a-j. A "target" in this context refers to an entity or resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

In some embodiments, targets 112a-i are different entities that are used or otherwise part of an application. For example, targets 112a-i may include load balancers, web servers, software resources, application servers, network hosts, databases, storage servers, and/or other computing resources used to provide an email application, social media application, or some other cloud-based service. The number and types of resources deployed may vary from one application to the next. Further, applications may evolve over time to add, upgrade, migrate, and/or remove resources.

Agents 114a-j comprise hardware and/or software logic for capturing time series measurements from a corresponding target (or set of targets) and sending these metrics to data collector 120. In some embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, heart rate monitors, etc., that capture time series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other cases, a single agent may monitor multiple resources locally on the same host or remotely across multiple hosts.

In some cases, agents 114a-j may be configured to capture data points at different times and/or sampling rates. For example, one agent may sample CPU performance on a host every ten minutes starting at 11:00 a.m. Another agent may sample active sessions on a database server every five minutes starting at 11:02 a.m. Thus, the sample data points from different entities may not be exactly aligned or sampled at the same interval, which allows for a more flexible and robust system.

In some embodiments, agents 114a-j may be configured to capture topology metadata that identifies relationships between different targets. For instance, the topology metadata may identify functional dependencies between different targets. As an example, page requests may be distributed by a load balancer across multiple web servers. A web server may process an incoming page request according to web-based protocols, such as HTTP and forward application-specific requests to an appropriate application server. An application server may functionally depend on an individual database or a cluster of databases to access and retrieve data used in the execution of application logic. The application server may return results to the web server, to be packaged and served to a requesting client. Topology metadata may capture such information, including metadata that identifies each individual resource that is deployed, the respective type of resource, and the respective functional dependencies of the resource. The topology metadata may comprise a set of nodes representing individual resources and edges connecting the nodes. Edges may identify functional dependencies and/or other relationships between different resources.

Data collector 120 includes logic for aggregating sample data captured by agents 114a-j into a set of one or more time series signals or data objects. Data collector 120 may store the time series data in data repository 140 and/or provide the time series data to anomaly management services 130. In one or more embodiments, data collector 120 receives data from agents 114a-j over one or more data communication networks, such as the Internet. Example communication protocols that may be used to transport data between the components illustrated within system 100 may include, without limitation, HTTP, simple network management protocol (SNMP), and other communication protocols of the internet protocol (IP) suite.

Data collector 120 may collect or generate timestamps for sample values in a time series. A timestamp for a sample value indicates the date and time at which the sample value was measured or otherwise observed. For example, CPU performance on a target host that is sampled every five minutes may have a sequence of timestamps as follows for the collected samples: August 16, 11:50 p.m., August 16, 11:55 p.m., August 17, 12:00 a.m., and August 17, 12:05 a.m. The sampling rate and manner in which the timestamp is encoded may vary from implementation to implementation.

Anomaly management services 130 provides a functionality or set of functionalities that may be invoked to automatically detect and/or otherwise manage anomalous behavior exhibited by targets resources. Anomaly management services 130 may be executed by one or more of hosts 110a-n or by one or more separate hosts, such as a server appliance that is operated independently from the managed hosts. One or more of anomaly management services 130 may be integrated into a network service, such as a software-as-a-service (SaaS), web service, a microservice, or any other cloud service.

Anomaly management services 130 may include, but is not limited to, anomaly detector 131, correlation analytic 132, anomaly summarizer 133, response interface 134 and presentation engine 135. Anomaly management services 130 may include one or more additional services and/or may omit one or more of the depicted services depending on the particular implementation. Different management services may implement a function or set of functions for managing anomalous entities in an application, in accordance with some embodiments. However, as previously indicated, the functions described with respect to one component may instead be performed by another component.

Anomaly detector 131 is configured to detect anomalies from input time series signals. In some embodiments, anomaly detector 131 identifies anomalies by training and evaluating a baseline model through machine-learning processes. Example machine-learning methods for training and evaluating baseline models are further described in U.S. application Ser. No. 15/609,938, titled "UNSUPERVISED METHOD FOR BASELINING AND ANOMALY DETECTION IN TIME-SERIES DATA FOR ENTERPRISE SYSTEMS", previously incorporated by reference.

Anomaly detector 131 may output a flag or some other indication of whether a given time series is exhibit anomalous behavior. Additionally or alternatively, anomaly detector 131 may output a set of data that indicates which sample data points within a given time series are anomalous and/or which sample data points are un-anomalous. An anomalous data point in this context may be a data point that diverges from an expected value or range of values as determined from a baseline model. An un-anomalous data point is a data point that has the expected value or falls within the expected range of values per the baseline.

Correlation analytic 132 is configured to identify similarities in anomalous time series based on overlap Similarity may be computed as a function of the extent and/or consistency of the overlap between anomalies of different time series. Correlation analytic 132 may output clusters of different time series signals and corresponding resources based on the similarity measure. The clusters may establish links between anomalous behavior from different resources, which may facilitate understanding of overall application behavior and isolate the root cause of performance degradation in an application.

Anomaly summarizer 133 is configured to analyze anomalies detected by anomaly detector 131 and output a set of one or more summaries. In some embodiments, anomaly summarizer 133 comprises an extensible set of summarizers, with each summarizer using a different set of rules and/or algorithms to collect anomalies and generate a corresponding summary. Different summarizers may generate summaries across varying application dimensions, such as by resource type, metric type, target host, and/or any other attribute or combination of attributes. For example, one summarizer may identify what percentage of detected anomalies occur within a group of database servers deployed in a cloud environment. A separate summarizer may identify a relative severity of anomalies that occur with respect to the response time for a set of web servers. Other summarizers may aggregate anomalies along other dimensions or combinations of dimensions.

Additionally or alternatively, a summarizer may generate a summary for a cluster output by correlation analytic 132. For instance, a summary for a cluster may identify how many anomalies are accounted for by all members of a cluster and individual members of the cluster. Cluster summaries are useful for analyzing anomalies in disparate resources that substantially overlap and exhibit divergent behavior that follow similar patterns.

In some embodiments, anomaly summarizer 133 assigns scores to summaries as a function of relative severity. The scores may be used to rank, filter, sort, present, and/or trigger other automated actions. For example, the scores may be used to isolate resources exhibiting the most severe divergence from a baseline and to prioritize responses.

Response interface 134 provides an interface through which automated responsive actions may be triggered. In some embodiments, response interface 134 provides an application programming interface (API) through which one or more responsive actions may be invoked. Response interface 134 may interact with other components of system 100, such as targets 112*a-j*. For example, response interface 134 may provide functionality, such as via an API and communication protocols, through which a resource may be shutdown or restarted. As another example, response interface 134 may provide an interface through which a resource configuration may be modified, such as by installing a patch, adjusting resource settings, or migrating the resource to a different host. One or more responsive actions may be invoked through an interactive interface, such as a graphical user interface (GUI), or automatically based on the generated summaries.

Presentation engine 135 is configured to generate and present interfaces based on the generated summaries. In some embodiments, presentation engine 135 may generate GUIs objects for viewing, navigating, and drilling-down on one or more summaries. Presentation engine 135 may automatically filter, sort, and/or otherwise organize the summaries as a function of how the summaries are scored. Additionally or alternatively, presentation engine 135 may provide recommendations and interface objects for invoking actions for resolving anomalies, such as restarting a resource or modifying resource configurations.

In some embodiments, presentation engine 135 includes a frontend interface that allows clients 150*a-k* and/or other system components to invoke anomaly management services 130. Presentation engine 135 may render user interface elements and receive input via user interface elements. Examples of interfaces include a GUI, a command line interface (CLI), a haptic interface, a voice command interface, and an API. Examples of user interface elements include checkboxes, radio buttons, dropdown lists, list boxes, buttons, toggles, text fields, date and time selectors, command lines, sliders, pages, and forms.

Data repository 140 includes volatile and/or non-volatile storage for storing data within system 100. Example data that may be stored may include, without limitation, time series data, summary information, summary scores, summarizer rules, and interface data. Data repository 140 may reside on a different host machine, such as a storage server that is physically separate from other components of system 100 or may be allocated from volatile or non-volatile storage on the same host machine.

Clients 150*a-k* represent one or more clients that may access anomaly management services 130 to generate, view, and navigate summaries. Additionally or alternatively, clients 150*a-k* may invoke responsive actions and/or configure automated triggers via the interfaces described herein. A "client" in this context may be a human user, such as an administrator, a client program, or some other application instance. A client may execute locally on the same host as anomaly management services 130 or may execute on a different machine. If executing on a different machine, the client may communicate with anomaly management services 130 via one or more data communication protocols according to a client-server model, such as by submitting HTTP requests invoking one or more of the services and receiving HTTP responses comprising results generated by one or more of the services.

Additional embodiments and/or examples relating to computer networks are described below in Section 6.0, entitled "Computer Networks and Cloud Networks."

3.0 Extensible Score-Based Summarization

3.1 Anomaly Detection

In some embodiments, system 100 provides real-time monitoring and score-based summarization for anomalous behavior exhibited by targets 112*a-j*. The techniques for summarizing anomalies may be integrated or otherwise used in conjunction with a variety of anomaly detection systems, such as statistical anomaly detectors and machine-learning models. An anomaly detection system may train, define, or otherwise include a baseline model representing expected patterns of behavior. The anomaly detection system may evaluate an input set of time series data to identify individual and/or sequences of data points that diverge from the baseline in a statistically significant manner.

In some embodiments, the anomaly detection system transforms an input set of time series data into an anomaly time series. An input set of time series data includes a sequence of sample values measured or otherwise captured over time. The input time series may be in a raw format without any indication of whether any anomalies exist and, if so, which data points might be anomalous. To transform the input time series, the anomaly detection system labels, retains, or otherwise stores data identifies which sample values are anomalous, if any. For example, the anomaly detection system may aggregate a set of timestamps for each sample value that is anomalous. Additionally or alternatively, a separate groups of timestamps may be aggregated for un-anomalous values.

Figure 2:
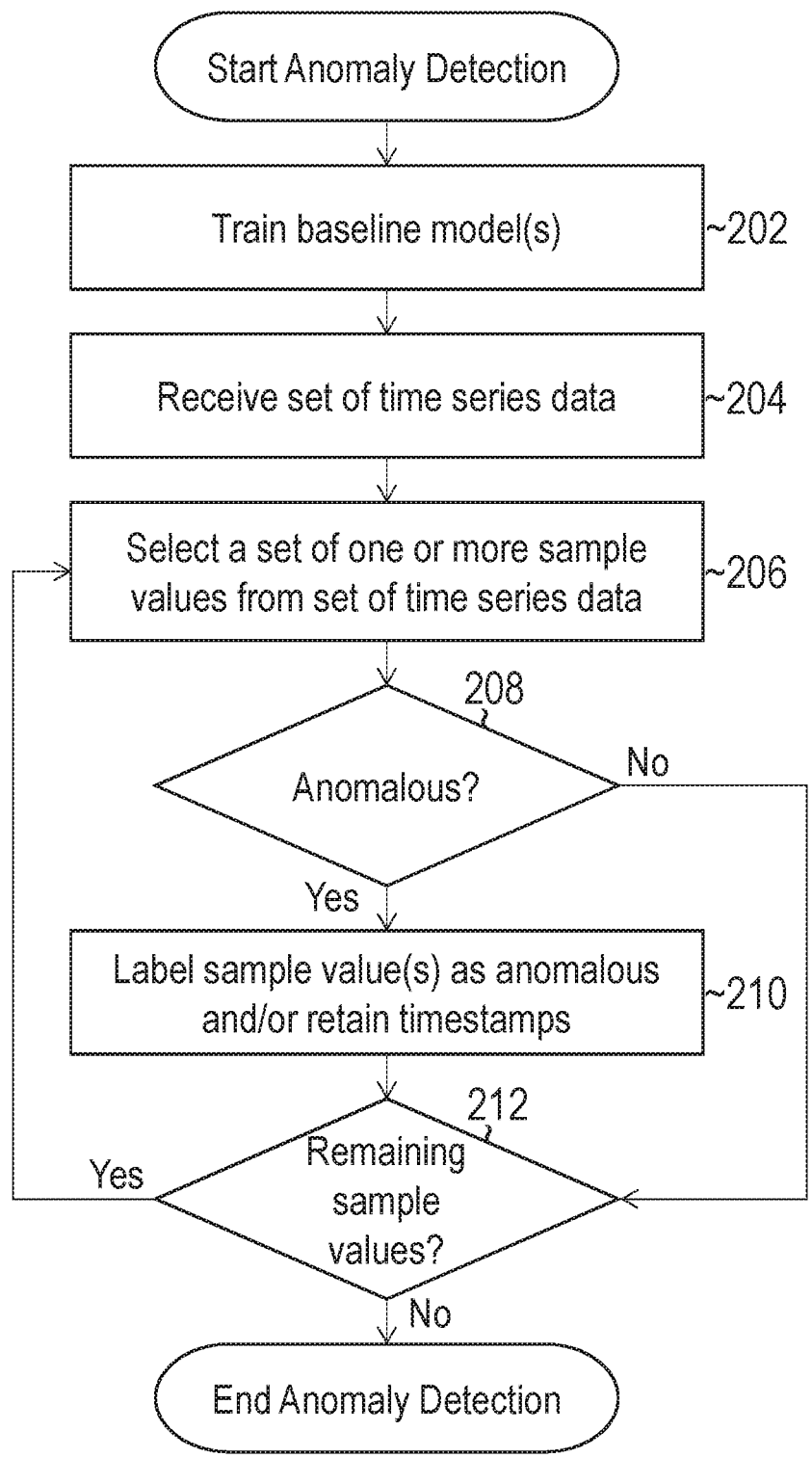
FIG. 2 illustrates an example process for constructing an anomaly time series in accordance with one or more embodiments.

FIG. 2 illustrates an example process for constructing an anomaly time series in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the anomaly detection process includes training a set of one or more baseline models (operation 202). In some embodiments, the example anomaly detection system described in U.S. application Ser. No. 15/609,938, titled "UNSUPERVISED METHOD FOR BASELINING AND ANOMALY DETECTION IN TIME-SERIES DATA FOR ENTERPRISE SYSTEMS" is used to detect anomalies. Thus, the anomaly detection system may automatically learn seasonal patterns and/or trends. However, other anomaly detection systems may be used in addition or as an alternative to provide real-time monitoring and detection of anomalous behavior.

In some embodiments, the process includes training multiple baseline models for resources at operation 202. A given resource may also have multiple baseline models trained for different metrics. For example, a host may be associated with one baseline model representing learned CPU patterns of behavior and another baseline model representing learned memory bandwidth patterns. As another example, a database server may be associated with various baseline models representing active sessions, I/O latency, average response time, and/or other metrics. Additionally or alternatively, other baseline metrics may also be trained for varying metrics and/or resources.

In some embodiments, a baseline correlation model may be trained to represent using expected correlations between two or more metrics at different points in time. For instance, a correlation time series may be computed by periodically computing correlation coefficients between CPU performance on a host and response time for a server. Additionally or alternatively, a correlation time series may be constructed for other combinations of metrics. For a given correlation time series, a baseline model may be trained to capture expected patterns of correlation between the different metrics.

Referring again to FIG. 2, the anomaly detection process includes receiving a set of time series data for evaluation (operation 204). The time series data may be provided by agents 114*a-j*, which may collect sample values periodically from target resources as previously described, to provide real-time monitoring. In other embodiments, historical or simulated time series data may be evaluated at this step. Evaluating historical data may be useful to diagnose past occurrences of performance degradation in an application. Simulated data may be useful to determine how application performance might be affected in the future in accordance with hypothetical or "what-if" scenarios, such as "what-if" CPU utilization exceeds 90% during peak workload.

The anomaly detection process further includes selecting a set of one or more sample values from a time series (operation 206). Sample values may be analyzed one by one and/or in sequences. In the former case, a sample value may be classified as anomalous if is different from an expected value or falls outside of a range of expected values. However, in some applications, having a single sample value fall outside of an expected range of values may not be statistically significant. Thus, the statistical anomaly detector may evaluate the sample value in the context of whether any adjacent values also diverge from expected behavior.

The set of operations further includes determining whether the selected set of one or more sample values are anomalous (operation 208). During this operation, the set of values may be compared to an expected set of values or range of values from the trained baseline models. In some embodiments, seasonal patterns and/or trends may be factored into the evaluation. For example, if the set of one or more sample values fall within a high season, then they may be compared with an expected range for seasonal highs, which may differ from an expected range for seasonal lows.

As previously indicated, some embodiments may classify a sample value as anomalous only if it diverges by a statistically significant amount from expected behavior. Determining whether a variation is statistically significant may vary depending on the particular implementation of the statistical anomaly detector. In some embodiments, a trained baseline model may define a range of values that capture a threshold percentage of all observed values. A value may be classified as anomalous if it falls outside the range. As another example, the value may be classified as anomalous only if it falls outside the range and a threshold number of adjacent values in the time series also fall outside the range.

If the selected set of one or more values are anomalous, then the anomaly detection process labels and/or retains timestamps indicating the time of the anomalies (operation 210). If there are any remaining time series values to analyze, then the process returns to operation 206 and repeats (operation 212). Once all the sample values have been classified, the process ends. The result is an anomaly time series that identifies the sample values and corresponding timestamps where anomalous behavior was detected from the input set of time series data.

3.2 Multiplex Score-Based Summarization

As previously mentioned, an anomaly time series identifies which data points have been classified as anomalous and which data points are un-anomalous. However, in isolation, this information may not provide much context for the overall health of an application. To provide additional context, which may facilitate diagnostics and root cause analysis, anomaly summarizer 133 may be configured to generate anomaly summaries.

In some embodiments, an anomaly summary provides analytic information about a group of disparate anomaly time series. Example summary information may include, but is not limited to:

Metric identifiers (e.g., active sessions, CPU performance, etc.) that specify which members of the group are being summarized and have been detected as exhibiting anomalous behavior;

Resource identifiers (e.g., hostnames, IP addresses, media access control addresses, server names, hardware identifiers) that specify which resources have been detected as exhibiting anomalous behavior;

Group statistics identifying anomaly occurrence rates and/or other anomaly statistics across groups of resources and/or resource metrics;

Severity levels identifying the magnitude of deviation from a baseline;

Summary scores representing a priority level for addressing a group of anomalies; and/or Recommended actions for mitigating anomalous behavior based on the members of the group being summarized.

In some embodiments, a summarizer uses a set of rules and/or algorithms to collect and analyze anomalies. For example, a set of rules may specify criteria that are matched against attributes of anomaly time series. The summarizer may group and analyze only anomaly-time series that have matching attributes. Additionally or alternatively, a summarizer algorithm may comprise executable instructions for grouping anomaly time series and/or generating summary information as a function of the anomaly time series and related attributes.

In some embodiments, a summarizer is configured to group anomalies along a set of one or more application dimensions. An application dimension in this context may include any characteristic or attribute of an application. Example application dimensions may include, but are not limited to, resource types (e.g., databases, hosts, middleware, etc.), specified resources (e.g., a particular host, database server, middleware application, etc.), metrics (e.g., active sessions, I/O metrics, CPU performance, average response times, etc.), resource location (e.g., country, state, region, etc.), tenant information (e.g., tenant identifiers, tenant groups, etc.), and configuration settings (e.g., network settings, security settings, etc.) A summarizer may be configured to generate a summary along any individual application dimension or combination of application dimensions. In particular, the summarizer may collect anomaly time series that match the specified application dimensions. For example, a summarizer may collect all anomaly time series for database servers on the west coast. Another summarizer may collect only anomalies in active sessions for database servers regardless of region. Multiple summarizers may be deployed to summarize anomalies along different individual application dimensions and/or combinations of dimensions. Multiplex summarization allows for anomalies to be analyzed in a variety of contexts, which may help establish links between disparate anomalies that may not be readily apparent.

The potential combination and permutations of application dimensions used for summarizing anomalies is quite large. Thus, it may not be feasible to manually review each summary. Further some of the summaries may have collected false positives or other low priority events that would be inefficient to process. To mitigate such overhead and inefficiencies, summarizers may be configured to assign scores to the corresponding summaries that are produced. A score may be indicative of a priority level for addressing anomalies collected by the summarizer. The score may be computed as a function of the relative severity levels for the collected anomalies. The higher the number and/or proportion of severe anomalies collected by a summarizer, the higher the score that may be assigned to the corresponding summary. This allows summaries that capture the greatest number of anomalies with the highest level of statistical confidence to be given the highest priority. Interfaces may be generated and automatic actions may be trigged as a function of a summary's score, as described further below.

Figure 3:
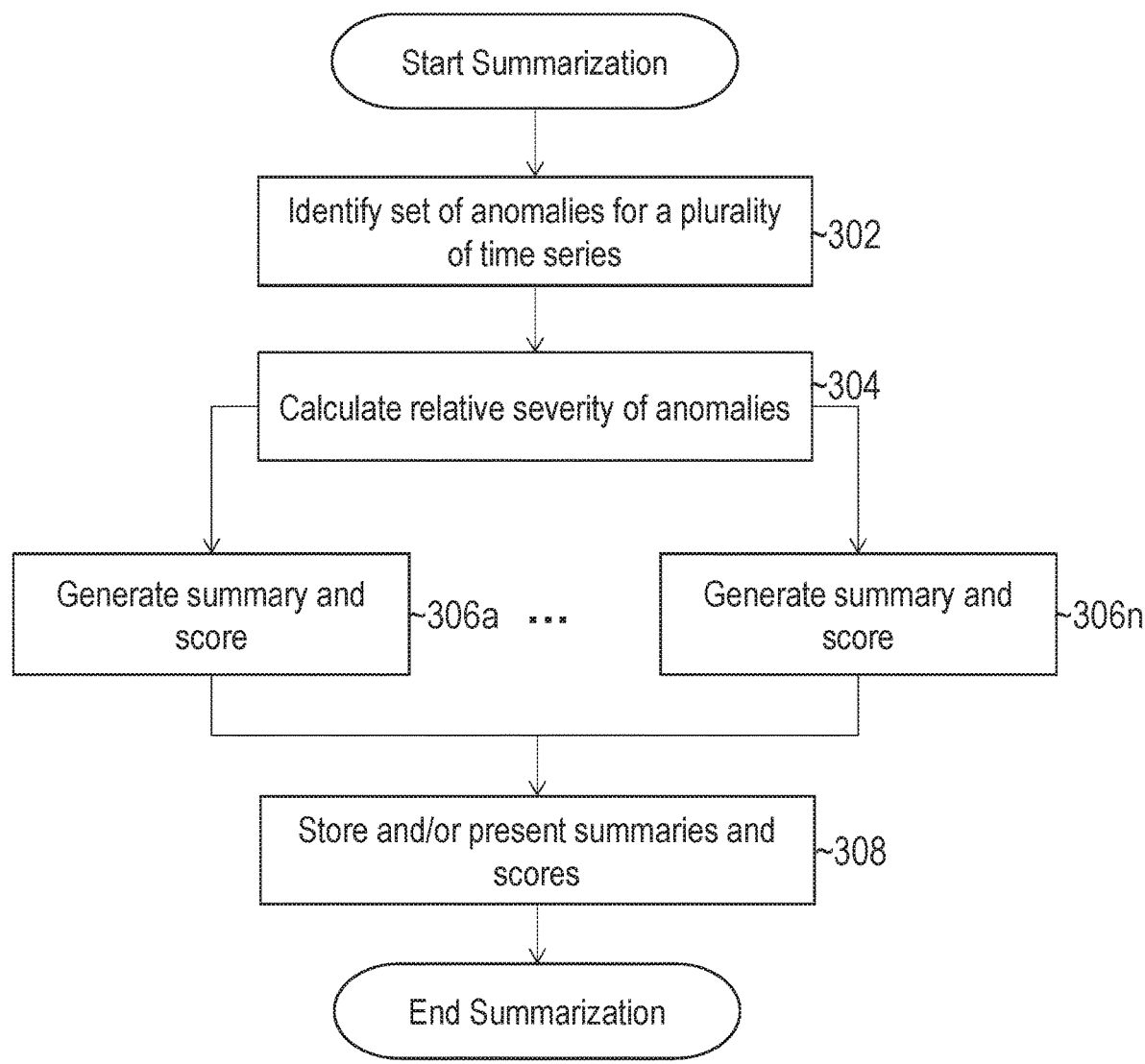
FIG. 3 illustrates an example process for multiplex summarization of anomalies in accordance with some embodiments.

FIG. 3 illustrates an example process for multiplex summarization of anomalies in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The summarization process includes identifying a set of anomalies for a plurality of time series (operation 302). In some embodiments, this operation processes anomaly time series constructed by anomaly detector 131. The anomalies may be detected based on the labels and/or timestamps for anomalous sample values. In other embodiments, anomaly detection may be performed as part of this operation or anomalous data may be labelled by a different source than anomaly detector 131.

The summarization process further includes calculating the relative severity of the anomalies (operation 304). A relative severity of an anomaly may be computed as a function of the baseline and the variation of the un-anomalous samples in the same time series. For example, given sample value $x_i$, the corresponding baseline may define an expected range that extends from the low $l_i$ to high $h_i$. Additionally, the minimum and maximum un-anomalous values in the time series may be defined as $\max_{a=0}$ and $\min_{a=0}$, respectively. The relative severity $s_i$ of an anomaly may be defined as follows:

$$s_i = \begin{cases} \dfrac{x_i - h_i}{\max_{a=0} - \min_{a=0}} & x_i > h_i \\ \dfrac{x_i - l_i}{\max_{a=0} - \min_{a=0}} & x_i < l_i \end{cases}$$

According to the above computation, when the anomalous sample is above the baseline, then the severity is positive, and when the anomalous sample is below the baseline, then the severity is negative. Thus, the relative severity may encode direction, which may be useful for diagnosing the root cause of performance degradation in an application.

It is noted that the formula for computing relative severity above is tightly coupled to the baseline model. The formula above may be supplemented or otherwise vary as the diversity of anomaly detectors increase and/or different baseline models are used. The relative severity may further vary based on the statistical confidence of a baseline model. Thus, the calculation provided above is provided for illustrative purposes, but may vary depending on the particular implementation.

Once the relative severities have been calculated, multiple summarizers generate a plurality of summaries and scores (operations 306a-n). As previously mentioned, each summarizer may generate a summary according to different rules and/or algorithms. For example, different summarizers may generate summary information across different respective application dimensions and/or combinations of dimensions. These operations may be executed in parallel to reduce overall execution time.

In some embodiments, the relative severities for each anomaly are passed as input to the summarizers. The score for a summary may be computed by summing, averaging, or otherwise aggregating the absolute relative severity of all sample anomaly values collected by the summarizer. By using the absolute values, the score does not differentiate between positive and negative relative severities, only the magnitude of the severities. However, in other embodiments, the direction of the anomaly may be factored into to the computation of the summary score. The result of operations 306a-n is a collection of summaries and corresponding scores for each.

The summarization process further includes storing, in volatile or non-volatile storage, and/or presenting the summaries and corresponding scores (operation 308). In some embodiments, all of the summaries may be retained. However, to reduce storage overhead, one or more summaries may be purged from storage to reduce storage costs. For example, summaries that have a score lower than a threshold may be discarded or only the top n summaries may be retained. Further processing may be applied to and/or triggered by the summaries as described further below.

3.3 Summarizer Configuration and Extensibility

In some embodiments, the summarizers are configurable and/or extensible. For example, system administrators may enable and/or disable summarizers based on the application dimensions that are most of interest. Additionally or alternatively, system administrators may define additional rules and/or algorithms for generating summaries. Thus, the anomaly summarizers that are run for a given application may be highly customizable and vary depending on the particular implementation.

Figure 4:
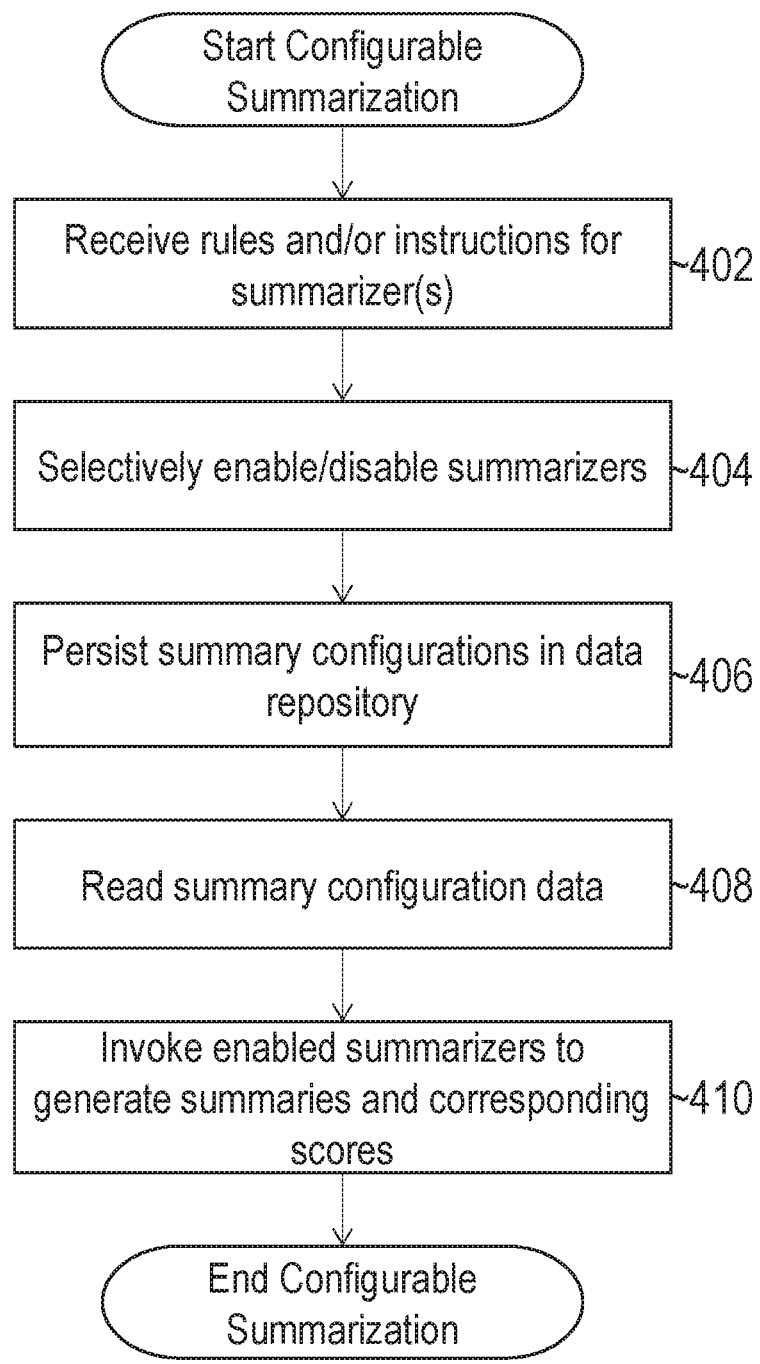
FIG. 4 illustrates an example process for running a custom set of anomaly summarizers in accordance with some embodiments.

One or more operations illustrated in FIG. 4 may be modified, rearranged, or omitted all together. Accordingly, the particular sequence of operations illustrated in FIG. 4 should not be construed as limiting the scope of one or more embodiments.

The configuration process includes receiving a set of rules and/or instructions for one or more summarizers (operation 402). In some embodiments, anomaly management services 130 may provide a guided interface for defining new summarizers. For example, the interface may include fields, drop-down menus, and/or other interface elements for specifying application dimensions. The interface may present a list of selectable application dimensions, which may include any attribute collected by agents 114a-j. Through the interface, the user may then select or otherwise input one or more application dimensions for summarizing anomalies. For instance, a user interested in anomalies in response times among production databases in a datacenter named "DATACENTER A" may select the following combination of dimensions:
 RESOURCE TYPE: DATABASE;
 RESOURCE VARIABLE: PRODUCTION
 RESOURCE LOCATION: DATACENTER A Other combinations of dimensions may also be selected by the user. The number of dimensions selected and the dimension values themselves may vary from one selection to the next.

Additionally or alternatively, a user may customize the summary information that is generated by a summarizer at operation 402. For example, the user may select or define what statistics to compute for a given summary. As another example, a user may provide scripts or other executable instructions for performing analytics on the collected anomaly. Each script may generate an analytic result as a function of the anomalies that are collected by a given summarizer. The analytic results may be stored and presented as part of the summary.

Referring again to FIG. 4, the configuration process further includes selectively enabling and/or disabling summarizers (operation 404). In some embodiments, a list of available summarizers is presented to a user through a GUI. The user may then enable or disable any of the summarizers in the list, such as by clicking on an interface element or otherwise interacting with the user interface. The GUI may further display information about each summarizer, such as how the summarizer collects anomalies and what analytics the summarizer performs. The available summarizers may include user-defined summarizers, such as summarizers defined during operation 402, a default set of summarizers pre-defined by the anomaly detection service, and/or third-party summarizers provided through external sources.

Once defined, the set of summarizer configuration data is persisted in the data repository (operation 406). The summarizer configurations identify which summarizers have been enabled, including any custom-defined summarizers, which may extend a default set of predefined summarizers. In some embodiments, the summarizer configuration data stores a list of enabled summarizers and pointers for invoking the rules/algorithms associated with each summarizer.

During anomaly detection, system 100 reads the summarizer configuration data to determine which summarizers to invoke (operation 408). Enabled summarizers are invoked to generate corresponding summaries and scores (operation 410). The scoring techniques previously described may be extended to any custom summarizers that are invoked. For example, a summarizer that collects anomalies along a custom set of dimensions may compute the score by aggregating the severity level of all anomalies that it collects. Disabled summarizers are not invoked and do not produce any summaries during this operation.

4.0 Correlation-Based Summarization

4.1 Overlapping Anomaly Ranges

The summarizers described above group anomalies across varying application dimensions even if anomalies from different time series do not follow similar behavioral patterns. For example, a summarizer may collect anomalies across different databases. However, one database may exhibit anomalous behavior during the morning while another database may exhibit anomalies in the evening. Thus, while the summarizer gives an overall view of the database health of an application, the summarizer may still group anomalies where the root causes differ.

In some embodiments, system 100 includes one or more summarizers that account for correlation in anomalies when collecting anomalies. Correlation-based summarizers may help isolate the root cause of anomalous behavior exhibited by multiple application resources. For example, a webpage may exhibit unusually slow load times. The correlation-based summarizer may detect that the slow load time correlates with slow response times by a web server, slow I/O times by a database, and high CPU utilization on a database host. Based on the application topology, it may be determined from the functional dependencies that the host is the root cause of the other anomalous behavior, which propagates up through the database server to the web server responses and finally the web page load times. Thus, correlation-based summarizers may help establish the root cause of performance degradation such that appropriate corrective actions may be directed in the most efficient and effective manner.

In some embodiments, correlation analytic 132 identifies correlations between disparate time series based on overlapping anomaly time ranges. In particular, a respective range of time may be assigned to each sample anomaly value within an anomaly time series. The ranges of time from one time series may be compared to timestamps and/or ranges of time assigned to another time series to identify correlated anomalous behavior. Assigning ranges of times allows for anomalies to persist beyond their discrete occurrence time, which provides flexibility in sampling rates and runtime tuning. Further, this approach allows summarizers to capture delays in correlated anomalous behavior within a prescribed timeframe. For example, an anomaly in page load times may lag anomalies in CPU performance that are the underlying root cause. Comparing overlapping anomaly ranges may also be done without computing correlation coefficients, such as Pearson coefficients, which may be a computationally expensive operation.

Figure 5:
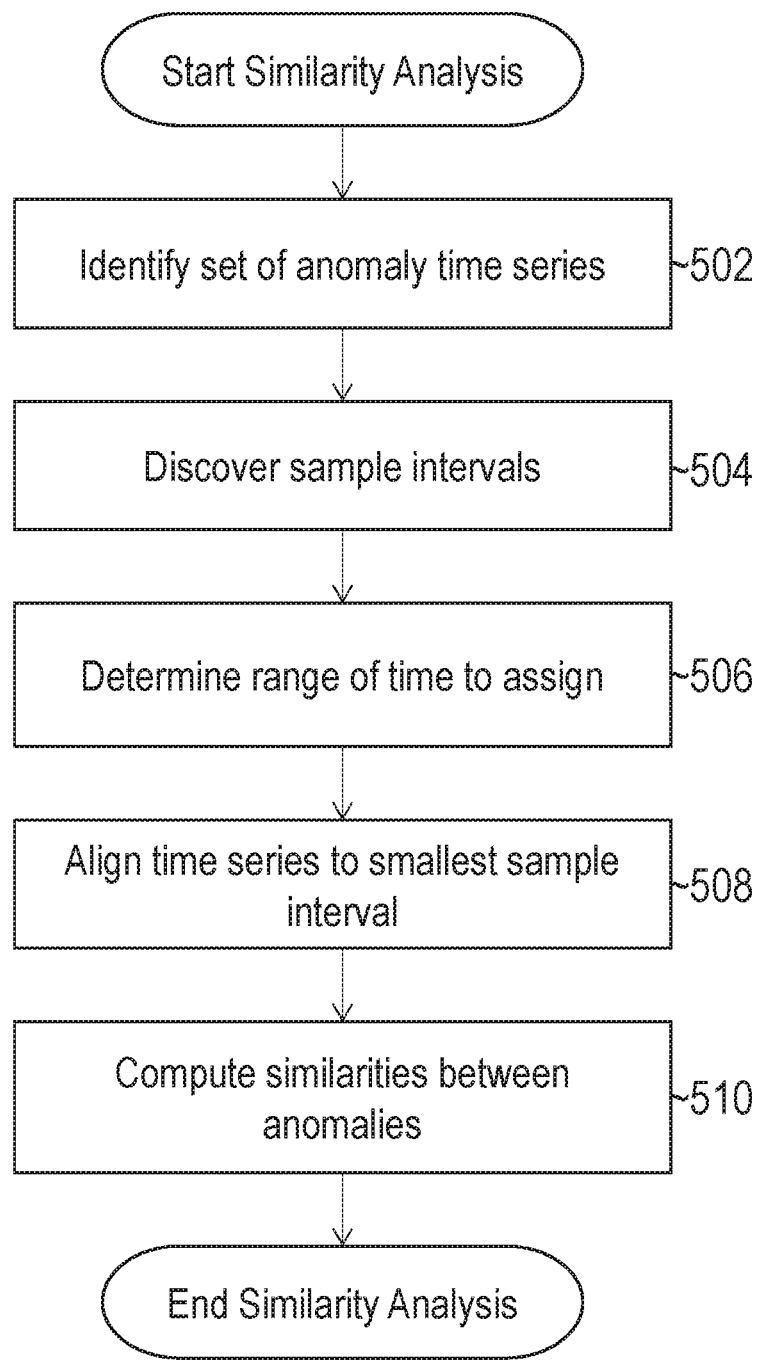
FIG. 5 illustrates an example process for constructing synthetic time series to determine anomaly similarities based on overlap in accordance with some embodiments.

FIG. 5 illustrates an example process for constructing synthetic time series to determine anomaly similarities based on overlap in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, the process includes identifying a set of anomaly time series (operation 502). For example, this operation may receive or otherwise process two or more anomaly time series constructed by anomaly detector 131. The anomaly time series may span different application resources and/or metrics.

The process further comprises discovering the sample intervals for each anomaly time series (operation 504). As previously mentioned, the sampling rate may vary between different time series. For example, one agent may sample resource metrics at one minute intervals and another agent may sample resource metrics every 5 minutes. The sample interval may be determined by analyzing the timestamps of the sample values or inspecting time series metadata defining the sample interval.

The process further includes determining a range of time to assign to anomalous samples as a function of the time series sample interval in which the anomaly occurs (operation 506). In some embodiments, the range of time expands the time when the anomaly was detected, per the timestamp, to plus or minus the sample interval. For example, a time series sample that occurs every five minutes means that an anomaly detected at 12:00 is assigned a range of time as if it persisted between 11:55 and 12:05. If the sample rate were two minutes instead, then the anomaly would persist between 11:58 and 12:02. In other embodiments, the anomaly may be persisted only into the future (e.g., 12:00 to 12:02 for the two minute sampling rate), into the past (e.g., 11:58 to 12:02) or over some other range of time. This operation may be applied to each anomalous time series or a subset thereof such as only to anomaly time series with the highest sample intervals.

Once the sample intervals and ranges of time have been determined, the process aligns the anomaly time series to the smallest sample interval (operation 508). In some embodiments, this operation includes aligning all the time series to a uniform sequence of timestamps occurring at the smallest interval. The time series may further be manipulated to allow for anomalies to persist beyond their discrete occurrence times in accordance with the ranges of time determined above.

Aligning the time series facilitates finding groups of anomalies that are concurrently "active" with one another. As previously mentioned, each anomaly may be expanded and persisted by a range of time that is equal to or otherwise determined as a function of the sample interval. In some embodiments, a supplied minimum may also be provided, and the anomaly may be persisted by the minimum if the sample interval is smaller than the supplied minimum. The prescribed minimum may act as a knob that may be adjusted during runtime to allow for dynamic tuning of the process.

Figure 6:
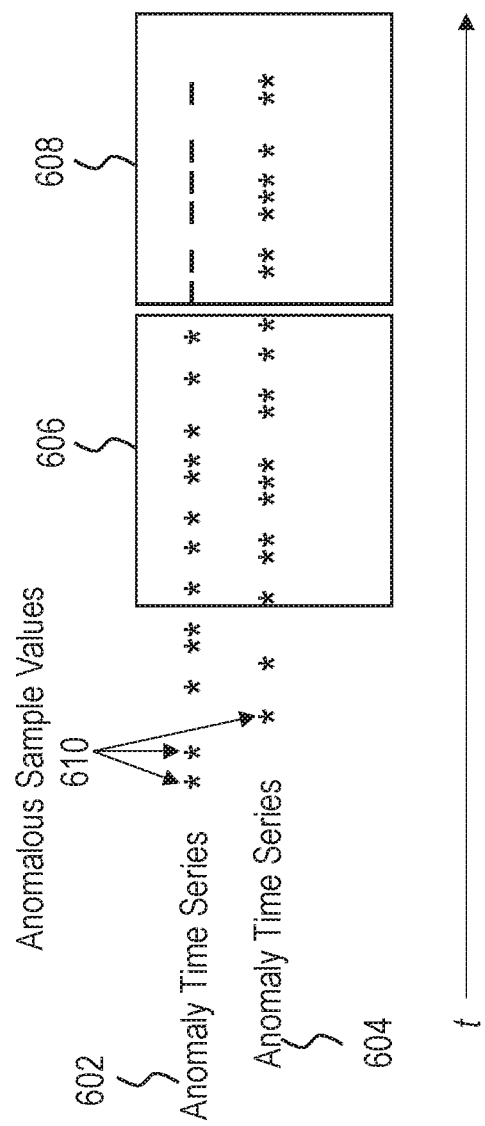
FIG. 6 illustrates an example result of constructing synthetic time series by persisting anomalies over assigned ranges of time in accordance with some embodiments.

FIG. 6 illustrates an example result of constructing synthetic time series by persisting anomalies over assigned ranges of time in accordance with some embodiments. As can be seen, anomaly time series 602 and time series 604 include several anomalous sample values 610. Within timespan 606, the anomalies only occur at discrete points in time. Thus, the amount of overlap between the anomalies from the different time series is limited. Within timespan 608, the anomalies of time series 602 have been expanded and persisted according to the techniques described above. As a result, the amount of overlap between anomalies in time series 602 and time 604 is much greater during timespan 608.

Referring again to FIG. 5, once the anomaly time series have been aligned with introduced persistence, the process computes the similarity between the anomalous behavior as a function of the extent of overlap between the persisted anomalies (operation 510). In some embodiments, the similarity may be computed as the ratio of the count of mutually occurring anomalies to the maximum independent anomaly count. For example, if x and y are a sequence of aligned and persisted anomaly samples with a value of 0 indicating no anomaly, the similarity can be written by the following equation.

$$s_{x,y} = \frac{count(x_i \neq 0, y_i \neq 0)}{max(count(x_i \neq 0), count(y_i \neq 0))}$$

If all anomalies in x and y co-occur (e.g., the ranges of time assigned to each anomaly in x overlaps with a range of time or timestamp for a corresponding anomaly in y), then $s_{x,y}=1$. Conversely if none of the anomalies co-occur, then $s_{x,y}=0$. Stated another way, the anomalous behavior between different time series is more similar as $s_{x,y}$ approaches 1 and less similar as $s_{x,y}$ approaches 0. Summarizers may leverage this computation to summarize anomalous behavior from disparate resources that are correlated.

4.2 Cluster-Based Scoring and Summarization

In some embodiments, anomaly time series are automatically clustered as a function of similarity. Any number of clustering algorithms may be used to generate clusters that group similar anomalies together. An agglomerative clustering approach is described in further detail herein. However, other clustering algorithms that may be used include, but are not limited to, k-means clustering, k-mode clustering, spectral clustering, and tri-point arbitration. Example clustering algorithms are further described in U.S. application Ser. No. 15/140,358, entitled "SCALABLE TRI-POINT ARBITRATION AND CLUSTERING", which was previously incorporated by reference.

Figure 7:
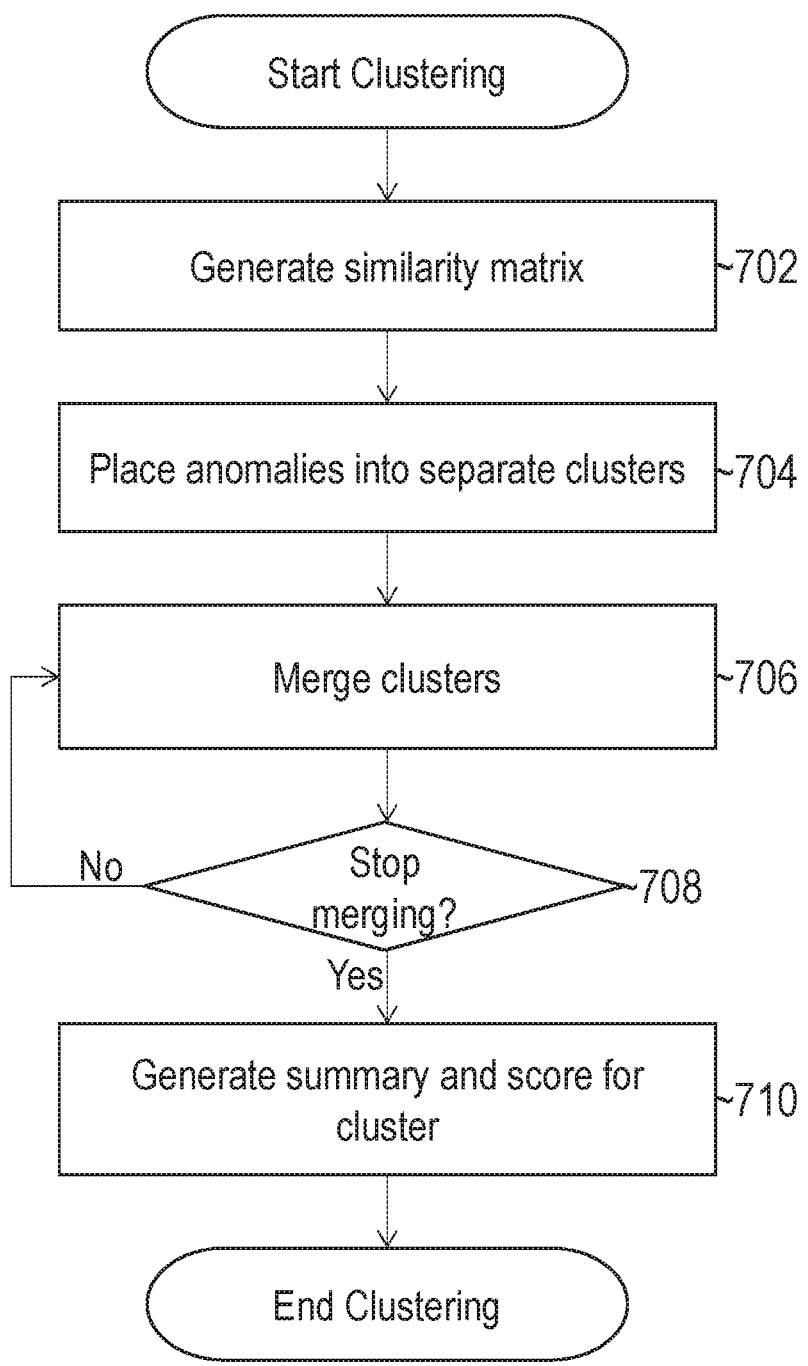
FIG. 7 illustrates an example process for generating anomalies for clusters of similar anomalies in accordance with some embodiments.

FIG. 7 illustrates an example process for generating anomalies for clusters of similar anomalies in accordance with some embodiments One or more operations illustrated in FIG. 7 may be modified, rearranged, or omitted all together. Accordingly, the particular sequence of operations illustrated in FIG. 7 should not be construed as limiting the scope of one or more embodiments.

Referring to FIG. 7, the process includes generating a similarity matrix for a plurality of anomaly time series (operation 702). In some embodiments, the similarity matrix comprises a set of distance values, where a distance value between a first anomaly, denoted x and a second anomaly, denoted y, is computed as follows:

$$d_{x,y} = 1 - s_{x,y}$$

The distance equation maps the similarity measure to the distance space, effectively reversing the relationship. Specifically, the distance approaches 0 the more similar the anomalies and vice versa as it approaches 1.

The distance equation above computes the distance between two anomalies. However, the clustering process may group several disparate anomaly time series. To compute a distance between two sets of anomaly time series, which may be represented as $\{x_1, x_2, \ldots, x_{n_x}\}$ and $\{y_1, y_2, \ldots, y_{n_y}\}$, respectively, averaging techniques may be employed. For example, with average linkage criteria for clustering, the distance between two anomaly time series may be written as follows:

$$d_{\{x_1, x_2, \ldots, x_{n_x}\}, \{y_1, y_2, \ldots, y_{n_y}\}} = \frac{\sum_{i=1}^{n_x} \sum_{j=1}^{n_y} d_{x_i, y_j}}{n_x \cdot n_y}$$

where $n_x$ represents the number of data points in the first anomaly time series and $n_y$ the average number of data points in the second anomaly time series.

The process further includes placing each anomaly time series into a separate cluster (operation 704). The result of this operation is a set of singleton clusters, with each cluster storing data identifying a different anomaly time series.

The process continues by merging a pair of clusters based on the similarity matrix (operation 706). For example, the process may merge the two closest clusters as indicated by the average distance calculation as described above.

The process next determines whether to continue merging clusters (operation 708). Simply clustering because it is possible is not useful. A stop condition may be defined prior to the above distance calculation that prevents consideration of joining clusters that are not logically useful. In some embodiments, two clusters may be considered candidates for being joined if (a) the clusters have a certain percentage of overlapping anomaly time series, and (b) the join would produce a cluster whose anomaly time series overlap most of the time. In other words, clusters may be joined if the samples in the resulting anomaly time series overlap most of the time and across most of the anomaly time series that make the cluster. In the present example, these two conditions to consider joining clusters are set at 0.5 or 50%. However, other values may be used. Further the values may be exposed as configurable knobs that may be adjusted by a client. If the process identifies candidates for clustering, then the process returns to operation 506 and iteratively repeats until the stop condition has been satisfied or only a single cluster remains.

Once clustering is complete, the process generates a summary and score for the clusters (operation 710). In some embodiments, the score for a cluster is computed by summing the absolute relative severities of the original observed anomaly times series that are part of the same cluster. The summary information, such as statistics and/or other information, may also be aggregated for members of the same cluster. The result of the process is using "overlapping aligned samples" to calculate similarities for pairs of anomaly time series and a set of clusters of anomaly time series by extent and consistency of overlap.

5.0 Actionable Analytics and Interfaces

As previously indicated, multiple summarizers may generate summaries and corresponding scores. The summaries and scores may be used to sort, filter, and/or perform analytics in accordance with some embodiments. For example, summaries may be sorted in volatile or non-volatile storage from highest to lowest or vice versa. As another example, a user may query the top-n summaries or summaries satisfying a certain score threshold. In response, system 100 may identify and return summaries having the top-n highest scores or scores satisfying the score threshold. Other query criteria may also be specified and executed as a function of any combination of the summary information and/or summary scores depending on the particular implementation.

FIG. 8 illustrates example list 800 of the top-n summaries, in accordance with some embodiments. In the present example, list 800 includes the top five summaries. However, the number of summaries that are returned and presented may vary from implementation to implementation. List 800 presents the summaries in order from highest scored to lowest scored. The first summary is a cluster summary in which 94% of anomalies were detected. The cluster summary includes nine different anomaly time series corresponding to nine different resource metrics. These resource metrics include the following:

Active sessions on web server C88WS;
Service time on web server C88WS;
Average active sessions on database C89DB;
Service response times on database C89DB;
File sequential read time on database C89DB;
Synchronous single block read latency on database C89DB;
Disk activity on host C89HD;
CPU utilization on host C89HD; and
Response time for application performance monitoring server C88PA.

The next two summaries in list 800 indicate that 47% of the anomalies occur in both the grouped application performance monitoring servers and the individual application performance monitoring server C88PA. From these two summaries, it may be deduced that all anomalies in the group of page servers happen on a single application performance monitoring server C88PA. The next summary identifies the specific metric that accounts for 45% of the anomalies (i.e., average response time), and the final summary in list 800 indicates that 24% of the anomalies occur on database servers.

It is noted that different summaries may have overlap in the anomalies that are collected. For example, a cluster summarizer may collect an anomaly time series for a particular database among other resource time series that exhibit similar anomalous behavior. Another summarizer may collect anomalies across all databases including the particular database even though the time series for the particular database was included in the cluster summary. Thus, one summarizer may collect a subset or all of the time series collected by a different summarizer. Each of the different summaries may provide a different perspective on the overall application health as can be seen from list 800.

Figure 9A:
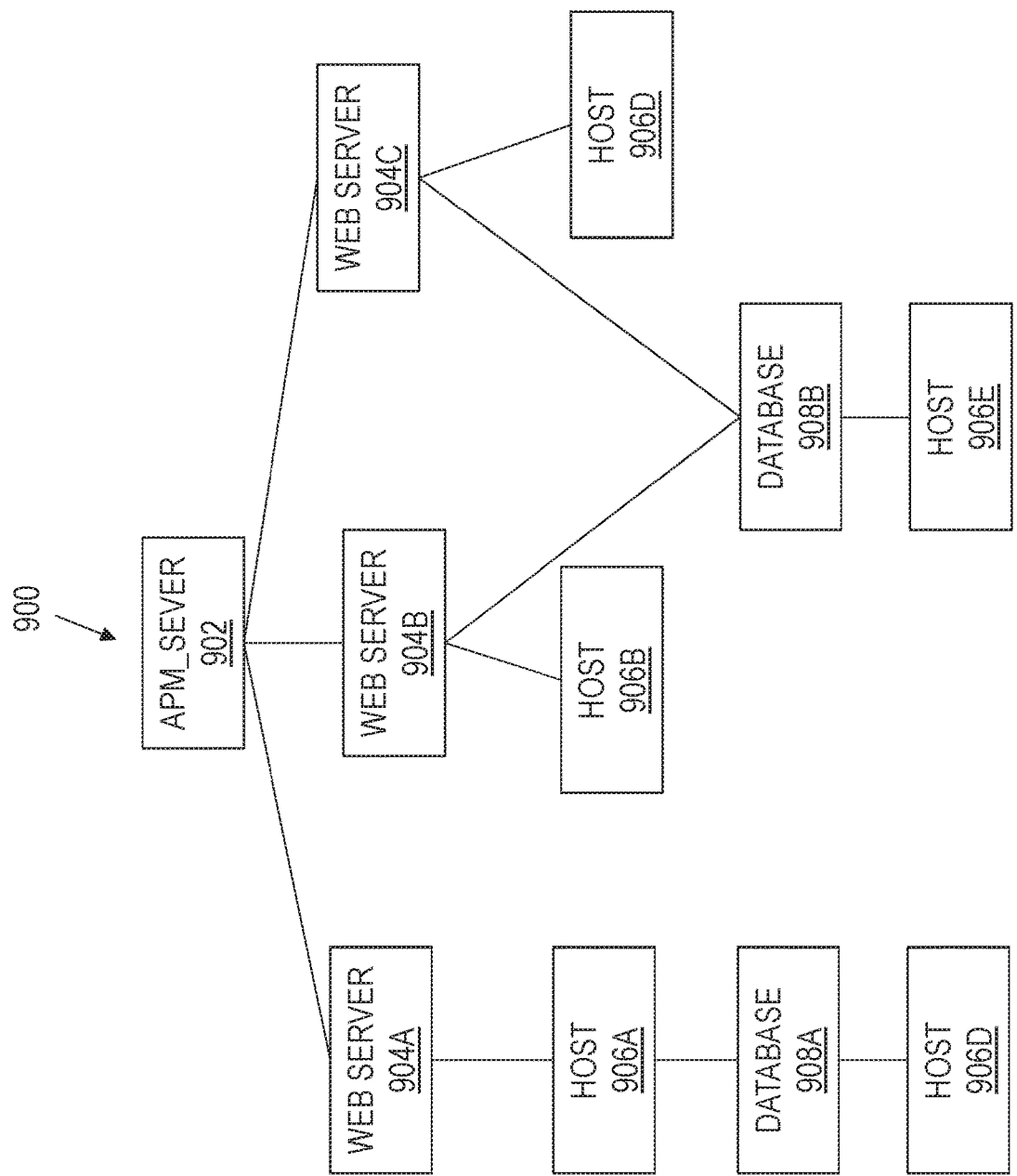
FIG. 9A illustrates an example interface for managing anomalies across different application resources in accordance with some embodiments

In some embodiments, topology metadata may be used in conjunction with the summaries to generate an interface. FIG. 9A illustrates example interface 900 for managing anomalies across different application resources in accordance with some embodiments. The interface displays visual icons representing a plurality of application resources, including performance monitoring server 902 for monitoring page hits, web servers 904a-c, hosts 906a-e, and databases 908a-b. In the present example, CPU and disk anomalies are present on host 906d and propagate up through database 908a to web server 904a and finally to application performance monitoring server 902. The correlated anomalies may be captured by a cluster summary using the techniques previously described. Interface 900 may highlight the visual icons along this anomalous chain or otherwise present a visual indicator to identify which application resources are exhibiting anomalous behavior.

Figure 9B:
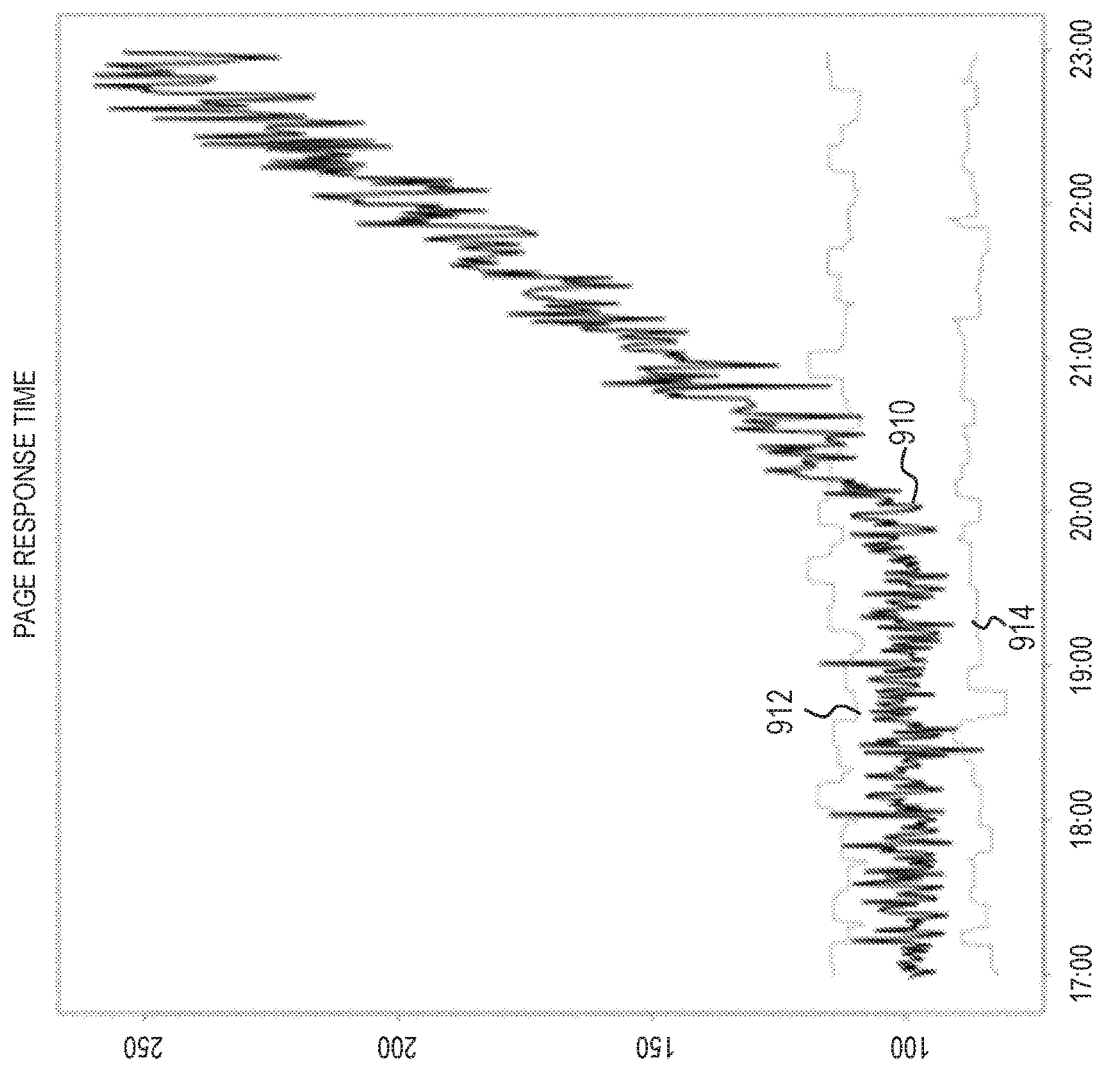
FIG. 9B illustrates an example anomalous time series for page response times in accordance with some embodiments.

In some embodiments, a user may drill down on interface 900 to view information about individual application resources. For example, FIG. 9B illustrates example anomalous time series 910 for page response times. The visualization may be presented in response to a user selecting the icon representing the application performance monitoring server 902. Upper bound 912 and lower bound 914 represent non-anomalous behavior for the time series, which may be determined by training a baseline model. As can be seen time series 910 follows expected patterns until a sudden shift triggers the sample metric values to significantly surpass upper bound 912.

Figure 9C:
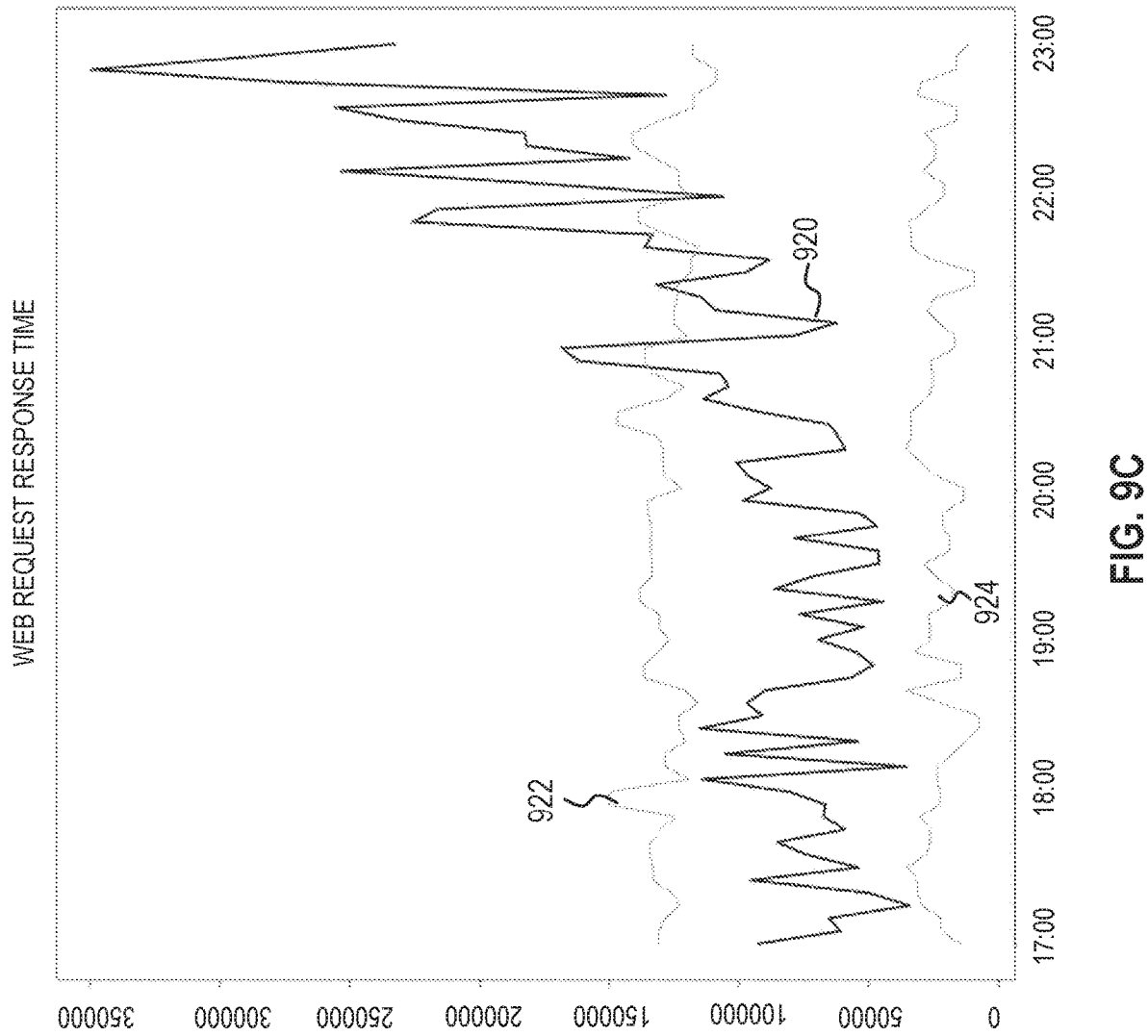
FIG. 9C illustrates an example anomalous time series for web request response times in accordance with some embodiments.

FIG. 9C illustrates example anomalous time series 920 for web request response times. The visualization may be presented in response to a user selecting an icon representing web server 904a. Upper bound 922 and lower bound 924 represent non-anomalous behavior for the time series, which may be determined by training a baseline model. As can be seen, time series 920 follows a similar pattern to time series 910 in exhibiting anomalous behavior. Similar charts may be displayed for the underlying database metrics and host metrics on database 908a and host 906d, respectively.

Interface 900 helps trace the root cause of performance degradation on application performance monitoring server 902 back to host 906d. With the root problem identified, appropriate corrective action may be directed at the offending resource. For example, the offending host may be restarted or database 908a may be migrated to a different host. Other corrective actions may include, but are not limited to, installing patches, adjusting resource configurations, redirecting requests, and/or shutting down the resource.

In some embodiments, interface 900 may present recommended actions for correcting problems. Any of the corrective actions previously mentioned may be recommended for one or more resources along the chain of anomalies. Additionally or alternatively, interface 900 may present interface elements, such as menus and buttons, through which a user may initiate a recommended actions and/or other actions. For example, a user may click on an icon representing database 908a and select, from a drop-down interface, an option to apply a patch to the resource. Other actions may also be triggered, depending on the particular implementation.

In some embodiments, system 100 may determine which actions to recommend based on the summaries and their corresponding scores. For example, system 100 may recommend patching or migrating resources that are included in a summary having the highest score. In other embodiments, system 100 may apply machine learning to determine what actions have been effective at correcting similar anomaly patterns. For example, system 100 may learn that a particular patch applied to web server 904b corrected anomalies that exhibited similar behavior to web server 904a. System 100 may then recommend the patch based on the learned summary and response patterns.

In some embodiments, one or more automated actions may be triggered as a function of the summaries and/or their corresponding scores. For example, summaries having the highest score may trigger automatic updates, security scans, and/or other actions with respect to the resources exhibiting the anomalous behavior. Other automated actions, such as restarting or stopping a resource, may also be taken to correct performance degradation and/or mitigate any damage that might be caused by the anomalous behavior. Response interface 134 may send commands or otherwise invoke functions, such as via an API, to perform the corrective actions one or more target resources identified by a summary. System 100 may thus provide real-time responses to the highest priority anomalies affecting an application.

6.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates computer system 1000 upon which an embodiment of the invention may be implemented. Computer system 1000 includes bus 1002 or other communication mechanism for communicating information, and a hardware processor 1004 coupled with bus 1002 for processing information. Hardware processor 1004 may be, for example, a general purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT) or light emitting diode (LED) monitor, for displaying information to a computer user. Input device 1014, which may include alphanumeric and other keys, is coupled to bus 1002 for communicating information and command selections to processor 1004. Another type of user input device is cursor control 1016, such as a mouse, a trackball, touchscreen, or cursor direction keys for communicating direction information and command selections to processor 1004 and for controlling cursor movement on display 1012. Input device 1014 typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1000 can receive the data on the network line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9.0. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
identifying a plurality of time series that track different metrics over time for a set of one or more computing resources;
detecting a first set of anomalies in a first time series, of the plurality of time series, that tracks a first metric over time;
assigning a different respective range of time to each anomaly in the first set of anomalies;
determining for said each anomaly whether the respective range of time assigned to the anomaly overlaps with timestamps or ranges of time associated with anomalies from one or more other time series, of the plurality of time series, that track one or more other metrics over time;
generating a cluster of a first group of metrics that groups the first metric and at least a second metric from the one or more other metrics based on how many anomalies in the first set of anomalies have respective ranges of time that overlap with timestamps or ranges of time associated with anomalies from the one or more other time series;
generating a second group of metrics, different than the first group of metrics, that matches a set of one or more application dimensions and also includes the first metric;
generating, based at least in part on a severity associated with anomalies in the first set of anomalies, a first score for the first group of metrics and a second score for the second group of metrics;
performing, based on at least the first score and the second score, at least one automated action for diagnosing or correcting a cause of anomalous behavior exhibited by at least one metric on at least one computing resource in the set of one or more computing resources.

2. The method of claim 1, wherein the first score is generated as a function of at least a set of relative severities for anomalies detected in the first metric and at least the second metric.

3. The method of claim 1, further comprising generating summary information for the cluster that identifies how many anomalies in an application are accounted for by members of the cluster.

4. The method of claim 1, wherein the set of one or more application dimensions include at least one dimension mapping to a particular resource type and wherein the second group of metrics are matched to a particular resource type.

5. The method of claim 1, wherein the at least one automated action includes presenting a set of anomaly summaries that satisfy a threshold score.

6. The method of claim 1, wherein the at least one automated action includes at least one of applying a patch, restarting a resource, shutting down a resource, migrating a resource, or adjusting a resource configuration.

7. The method of claim 1, wherein the set of one or more application dimensions include one or more of a specified resource, a metric type, a resource location, or a configuration setting.

8. The method of claim 1, further comprising generating a summary of anomalies along the set of one or more application dimensions.

9. One or more non-transitory computer-readable media storing instructions, which when executed by one or more hardware processors, cause:
identifying a plurality of time series that track different metrics over time for a set of one or more computing resources;
detecting a first set of anomalies in a first time series, of the plurality of time series, that tracks a first metric over time;

assigning a different respective range of time to each anomaly in the first set of anomalies;

determining for said each anomaly whether the respective range of time assigned to the anomaly overlaps with timestamps or ranges of time associated with anomalies from one or more other time series, of the plurality of time series, that track one or more other metrics over time;

generating a cluster of a first group of metrics that groups the first metric and at least a second metric from the one or more other metrics based on how many anomalies in the first set of anomalies have respective ranges of time that overlap with timestamps or ranges of time associated with anomalies from the one or more other time series;

generating a second group of metrics, different than the first group of metrics, that matches a set of one or more application dimensions and also includes the first metric;

generating, based at least in part on a severity associated with anomalies in the first set of anomalies, a first score for the first group of metrics and a second score for the second group of metrics;

performing, based on at least the first score and the second score, at least one automated action for diagnosing or correcting a cause of anomalous behavior exhibited by at least one metric on at least one computing resource in the set of one or more computing resources.

10. The one or more non-transitory computer-readable media of claim 9, wherein the first score is generated as a function of at least a set of relative severities for anomalies detected in the first metric and at least the second metric.

11. The one or more non-transitory computer-readable media of claim 9, wherein the instructions further cause generating summary information for the cluster that identifies how many anomalies in an application are accounted for by members of the cluster.

12. The one or more non-transitory computer-readable media of claim 11, wherein the set of one or more application dimensions include at least one dimension mapping to a particular resource type and wherein the second group of metrics are matched to a particular resource type.

13. The one or more non-transitory computer-readable media of claim 9, wherein the at least one automated action includes presenting a set of anomaly summaries that satisfy a threshold score.

14. The one or more non-transitory computer-readable media of claim 9, wherein the at least one automated action includes at least one of applying a patch, restarting a resource, shutting down a resource, migrating a resource, or adjusting a resource configuration.

15. A system comprising:
one or more hardware processors;
one or more non-transitory computer-readable media storing instructions, which when executed by the one or more hardware processors, cause:

identifying a plurality of time series that track different metrics over time for a set of one or more computing resources;

detecting a first set of anomalies in a first time series, of the plurality of time series, that tracks a first metric over time;

assigning a different respective range of time to each anomaly in the first set of anomalies;

determining for said each anomaly whether the respective range of time assigned to the anomaly overlaps with timestamps or ranges of time associated with anomalies from one or more other time series, of the plurality of time series, that track one or more other metrics over time;

generating a cluster of a first group of metrics that groups the first metric and at least a second metric from the one or more other metrics based on how many anomalies in the first set of anomalies have respective ranges of time that overlap with timestamps or ranges of time associated with anomalies from the one or more other time series;

generating a second group of metrics, different than the first group of metrics, that matches a set of one or more application dimensions and also includes the first metric;

generating, based at least in part on a severity associated with anomalies in the first set of anomalies, a first score for the first group of metrics and a second score for the second group of metrics;

performing, based on at least the first score and the second score, at least one automated action for diagnosing or correcting a cause of anomalous behavior exhibited by at least one metric on at least one computing resource in the set of one or more computing resources.

16. The system of claim 15, wherein the first score is generated as a function of at least a set of relative severities for anomalies detected in the first metric and at least the second metric.

17. The system of claim 15, wherein the instructions further cause generating summary information for the cluster that identifies how many anomalies in an application are accounted for by members of the cluster.

18. The system of claim 15, wherein the set of one or more application dimensions include at least one dimension mapping to a particular resource type and wherein the second group of metrics are matched to a particular resource type.

19. The system of claim 15, wherein the at least one automated action includes presenting a set of anomaly summaries that satisfy a threshold score.

20. The system of claim 15, wherein the at least one automated action includes at least one of applying a patch, restarting a resource, shutting down a resource, migrating a resource, or adjusting a resource configuration.

* * * * *